United States Patent
Dong et al.

(10) Patent No.: US 12,315,930 B2
(45) Date of Patent: May 27, 2025

(54) ARTIFICIAL GRAPHITE AND PREPARATION METHOD THEREOF, NEGATIVE ELECTRODE PLATE, SECONDARY BATTERY, BATTERY MODULE, BATTERY PACK AND ELECTRICAL DEVICE

(71) Applicant: CONTEMPORARY AMPEREX TECHNOLOGY (HONG KONG) LIMITED, Hong Kong (CN)

(72) Inventors: Xiaobin Dong, Ningde (CN); Jiazheng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/174,652

(22) Filed: Feb. 27, 2023

(65) Prior Publication Data
US 2023/0282829 A1  Sep. 7, 2023

Related U.S. Application Data

(63) Continuation of application No. PCT/CN2021/114219, filed on Aug. 24, 2021.

(51) Int. Cl.
*H01M 4/587* (2010.01)
*C01B 32/205* (2017.01)
*H01M 4/02* (2006.01)

(52) U.S. Cl.
CPC .......... *H01M 4/587* (2013.01); *C01B 32/205* (2017.08); *C01P 2002/88* (2013.01);
(Continued)

(58) Field of Classification Search
CPC .......... H01M 4/587; H01M 2004/021; H01M 2004/027; H01M 4/133; H01M 4/1393;
(Continued)

(56) References Cited

U.S. PATENT DOCUMENTS

| 4,169,767 A | 10/1979 | Noguchi et al. |
| 2002/0015888 A1 | 2/2002 | Omaru et al. |

(Continued)

FOREIGN PATENT DOCUMENTS

| CN | 103969148 A | 8/2014 |
| CN | 104685680 A | 6/2015 |

(Continued)

OTHER PUBLICATIONS

The extended European search report received in the corresponding European application 21937204.2 mailed Jul. 13, 2023.
(Continued)

*Primary Examiner* — Daniel S Gatewood
(74) *Attorney, Agent, or Firm* — K&L Gates LLP

(57) ABSTRACT

An artificial graphite and preparation method thereof, negative electrode plates, secondary batteries, battery modules, battery packs, and electrical device are provided. In some embodiments, the artificial graphite has a particle size of Dv50≤ 16 μm and an air oxidation peak temperature $T_{peak}$ of ≥ 830° C., wherein the air oxidation peak temperature $T_{peak}$ of artificial graphite refers to the highest peak temperature of a differential thermo-gravimetric analysis curve obtained when the artificial graphite is subjected to a thermo-gravimetric test having a weighing mass of 10±0.05 mg, with a purging gas of air, an airflow rate of 60 mL/min, and a heating rate of 5° C./min, in a test temperature range of 40° C. to 950° C. By the present application, the resulting
(Continued)

secondary batteries have higher first-cycle Coulomb efficiency and longer cycle life under the premise of good fast charging performance.

15 Claims, 6 Drawing Sheets

(52) U.S. Cl.
CPC ...... *C01P 2004/61* (2013.01); *C01P 2004/84* (2013.01); *C01P 2006/11* (2013.01); *C01P 2006/12* (2013.01); *C01P 2006/32* (2013.01); *C01P 2006/40* (2013.01); *H01M 2004/021* (2013.01); *H01M 2004/027* (2013.01)

(58) Field of Classification Search
CPC .... H01M 4/583; H01M 10/0525; H01M 4/02; H01M 10/052; H01M 2220/20; C01B 32/205; C01P 2002/88; C01P 2004/61; C01P 2004/84; C01P 2006/11; C01P 2006/12; C01P 2006/32; C01P 2006/40; Y02E 60/10

See application file for complete search history.

(56) References Cited

U.S. PATENT DOCUMENTS

| | | | |
|---|---|---|---|
| 2007/0092429 A1 | 4/2007 | Mao et al. | |
| 2015/0255793 A1* | 9/2015 | Wakizaka | C01B 32/21 252/182.1 |
| 2022/0123307 A1* | 4/2022 | Li | H01M 4/1393 |

FOREIGN PATENT DOCUMENTS

| | | | | |
|---|---|---|---|---|
| CN | 105958070 A | | 9/2016 | |
| CN | 113207313 A | | 8/2021 | |
| JP | 2001229914 A | | 8/2001 | |
| JP | 2017045574 A | | 3/2017 | |
| JP | 2019164967 A | * | 9/2019 | |
| KR | 20150134945 A | | 12/2015 | |
| KR | 20190115834 A | | 10/2019 | |
| WO | 2012039477 A1 | | 3/2012 | |
| WO | 2019194554 A1 | | 10/2019 | |
| WO | 2021108982 A1 | | 6/2021 | |
| WO | WO-2021108981 A1 | * | 6/2021 | ............. C01B 32/05 |

OTHER PUBLICATIONS

International Search Report received in the corresponding International Application PCT/CN2021/114219, mailed May 5, 2022.
The Notice of Reasons for Refusal received in the corresponding Japanese application 2022-550972, mailed Oct. 10, 2023.
First OA received in CN Application No. 202180006552.1; mailed Jul. 11, 2024.
First OA received in KR Application No. 10-2022-7027770; mailed Jun. 27, 2024.
Thermogravimetric Analysis (TGA); by PerkinElmer, Inc.
The Notice of Allowance received in the counterpart Korean Application 10-2022-7027770, mailed on Jan. 22, 2025.
Ibrahim Hassan Al-Haj: "Analysis and Characterization of High-Volatile Petroleum Coke", Recent Advances in Petrochemical Science, vol. 6, No. 1, Oct. 5, 2018 (Oct. 5, 2018), XP093114227, ISSN: 2575-8578, DOI: 10.19080/RAPSCI.2018.06.555677 Retreived from the Internet: URL: https://dx.doi.org/10.1098/RAPSCI.2018.06.555677.
The second office action of countetpart CN application No. 202180006552.1, mailed on Apr. 8, 2025, 7 pages with English translation.
The third office action of countetpart EP application No. 21937204.2, mailed on Apr. 8, 2025, 16 pages.

* cited by examiner

ARTIFICIAL GRAPHITE AND PREPARATION METHOD THEREOF, NEGATIVE ELECTRODE PLATE, SECONDARY BATTERY, BATTERY MODULE, BATTERY PACK AND ELECTRICAL DEVICE

CROSS-REFERENCE OF RELATED APPLICATIONS

The present application is a continuation of International Application PCT/CN2021/114219, filed Aug. 24, 2021 and entitled "ARTIFICIAL GRAPHITE AND PREPARATION METHOD THEREOF, NEGATIVE ELECTRODE PLATE, SECONDARY BATTERY, BATTERY MODULE, BATTERY PACK AND ELECTRICAL DEVICE", which is incorporated herein in its entirety by reference.

TECHNICAL FIELD

The present application belongs to the technical field of secondary battery, in particular to artificial graphite and preparation method thereof, negative electrode plates, secondary batteries, battery modules, battery packs, and electrical device.

BACKGROUND

A secondary battery is charged and discharged by repeatedly intercalating and de-intercalating active ions between positive and negative electrodes and has outstanding features of high energy density, long cycle life, no pollution and no memory effect. Therefore, as a clean energy, secondary batteries have been gradually popularized from electronic products to large-scale devices such as electric vehicles to adapt to the sustainable development strategy of environment and energy. However, compared with traditional fuel vehicles with fast and timely refueling, electric vehicles are generally charged at a smaller rate, which often requires a long charging time, causing consumers to worry about cruising range and limiting rapid spread of electric vehicles.

SUMMARY

An object of the present application is to provide an artificial graphite and preparation method thereof, negative electrode plates, secondary batteries, battery modules, battery packs, and electrical device, which are intended to reduce irreversible consumption of active ions, so as to enable secondary batteries to have higher first-cycle Coulomb efficiency and longer cycle life under the premise of have good fast charging performance.

A first aspect of the present application provides an artificial graphite, having a particle size of $Dv50 \leq 16$ μm and an air oxidation peak temperature $T_{peak}$ of $\geq 830°$ C., wherein the air oxidation peak temperature $T_{peak}$ of artificial graphite refers to the highest peak temperature of a differential thermo-gravimetric analysis curve obtained when the artificial graphite is subjected to a thermo-gravimetric test having a weighing mass of 10±0.05 mg, with a purging gas of air, an airflow rate of 60 mL/min, and a heating rate of 5° C./min, in a test temperature range of 40° C. to 950° C.

When having a particle size of $Dv50 \leq 16$ μm, and an air oxidation peak temperature $T_{peak}$ of $\geq 830°$ C., the artificial graphite has a moderate number of electrochemical active sites on the surface thereof and thus also moderate activity and irreversible consumption of active ions with the artificial graphite is lower, so that secondary batteries adopting it can have higher first-cycle Coulomb efficiency and longer cycle life under the premise of good fast charging performance.

In some embodiments, the particle size Dv50 of artificial graphite is from 13 μm to 16 μm. In some embodiments, the particle size Dv50 of artificial graphite is from 13 μm to 15.5 μm.

The particle size Dv50 of artificial graphite within an appropriate range can enable the artificial graphite to have higher active ion and electron transport performance and better fast charging performance, while making sure that the artificial graphite can have higher powder compaction density.

In some embodiments, the air oxidation peak temperature $T_{peak}$ of artificial graphite is from 830° C. to 840° C. In some embodiments, the air oxidation peak temperature $T_{peak}$ of artificial graphite is from 831° C. to 838° C.

The air oxidation peak temperature $T_{peak}$ of artificial graphite within an appropriate range can enable secondary batteries adopting it to have good fast charging performance, higher first circle Coulomb efficiency and longer cycle life.

In some embodiments, the artificial graphite does not have an amorphous carbon coating layer on its surface.

In some embodiments, the artificial graphite has a particle size Dv10 of $\geq 5$ μm. In some embodiments, the particle size Dv10 of the artificial graphite is from 5 μm to 9 μm.

The particle size Dv10 of artificial graphite within appropriate scope can enable the artificial graphite to have more suitable specific surface area, so as to the irreversible consumption of active ions to be lower.

In some embodiments, the artificial graphite has a specific surface area of 0.8 m²/g to 1.1 m²/g. In some embodiments, the specific surface area of the artificial graphite is from 0.95 m²/g to 1.05 m²/g.

Artificial graphite having a suitable specific surface area can reduce side reaction of an electrolytic solution on surface of the artificial graphite, reduce gas production inside secondary batteries, reduce volume expansion of secondary batteries in the cycle process, and can further enable negative electrode plate and secondary batteries to have high dynamic performance.

In some embodiments, the artificial graphite has a tap density of $\geq 1$ g/cm³. In some embodiments, the tap density of the artificial graphite is from 1.10 g/cm³ to 1.30 g/cm³.

By adopting the artificial graphite having the tap density according to above-mentioned embodiment may enable the negative electrode plate to have more suitable porosity, and make sure that the negative electrode plate has better electrolyte infiltration performance, so that the secondary battery has longer cycle life and higher energy density.

In some embodiments, the artificial graphite has a powder compaction density of $\geq 1.6$ g/cm³ under a force of 20000N. In some embodiments, the powder compaction density of the artificial graphite is from 1.6 g/cm³ to 1.85 g/cm³ under a force of 20000N.

In some embodiments, the powder compaction density of artificial graphite is $\geq 1.7$ g/cm³ under a force of 50000N. In some embodiments, the powder compaction density of artificial graphite is from 1.7 g/cm³ to 2.0 g/cm³ under a force of 50000N.

By adopting the artificial graphite having the powder compaction density according to above-mentioned embodiment may enable the artificial graphite to have higher gram capacity. The negative electrode plate adopting the artificial graphite also has a higher compaction density, and the secondary battery also has a higher energy density.

In some embodiments, the artificial graphite has a gram capacity of ⩾ 353 mAh/g. In some embodiments, the gram capacity of the artificial graphite is from 353 mAh/g to 360 mAh/g.

In some embodiments, the artificial graphite has a first-cycle Coulomb efficiency of ⩾ 95%. In some embodiments, the first-cycle Coulomb efficiency of artificial graphite is ⩾ 95.3%.

A second aspect of the present application provides a method for preparing artificial graphite, the method comprising the steps: S10, providing green coke powder containing volatile components, S20, carrying out thermal deposition to the green coke powder so as to make at least part of the volatile components contained in the green coke powder to be deposited on the surface of the green coke powder, S30, carrying out graphitization to the green coke powder that has been subjected to the thermal deposition, S40, carrying out cooling and discharging to obtain the artificial graphite having a particle size Dv50 of ⩽ 16 μm, and an air oxidation peak temperature $T_{peak}$ of ⩾ 830° C., wherein the air oxidation peak temperature $T_{peak}$ of artificial graphite refers to the highest peak temperature of a differential thermo-gravimetric analysis curve obtained when the artificial graphite is subjected to a thermo-gravimetric test having a weighing mass of 10±0.05 mg, with a purging gas of air, an airflow rate of 60 mL/min, and a heating rate of 5° C./min, in a test temperature range of 40° C. to 950° C.

In some embodiments, in step S10, the green coke powder as provided contains volatile components in a mass content of ⩾ 8.5%. In some embodiments, the green coke powder as provided contains volatile components in a mass content of 9% to 10.5%.

When green coke powder has a high content of volatile components, the volatile components can deposit on the surface of artificial graphite as prepared and form an integral protective layer, and the protective layer can fully modify defect sites on the surface of artificial graphite, reduce specific surface area of artificial graphite, reduce irreversible consumption of active ions and improve first-cycle Coulomb efficiency and cycle life of the secondary battery.

In some embodiments, in step S10, the green coke powder as provided has a particle size Dv10 of ⩾ 23.0 μm.

The particle size Dv10 of green coke powder within a suitable range can reduce the content of fine powder in the green coke powder and reduce irreversible consumption of active ions with artificial graphite.

In some embodiments, in step S10, the green coke powder as provided has a particle size Dv50 of ⩽ 16 μm.

The particle size Dv50 of green coke powder within a suitable range can make sure that the artificial graphite as prepared has good fast charging performance.

In some embodiments, in step S10, providing the green coke powder containing volatile components comprises the substeps of carrying out coking treatment to green coke raw material to obtain green coke, and pulverizing the green coke to obtain green coke powder.

In some embodiments, the coking treatment to green coke raw material is carried out at a temperature of ⩽ 550° C. Further, the coking treatment to green coke raw material is carried out at a temperature of 450° C. to 550° C. Selecting an appropriate coking temperature is beneficial to obtain green coke with a high content of volatile components.

In some embodiments, the green coke raw material is preheated for a period of ⩾ 5 h. Selecting an appropriate preheating period can reduce bulk structural defects of the resulting green coke.

In some embodiments, the pulverizing step is carried out with a mechanical pulverizing equipment.

The mechanical pulverizing equipment is to make lumpy green coke broken to obtain green coke powder by the mode of collision, and during the collision, green coke powder particles of an irregular shape can be polished, so that the green coke powder particles are transformed from an irregular shape to a spherical shape, thereby reducing surface defect sites of artificial graphite and reducing irreversible consumption of active ions.

In some embodiments, in step S10, green coke powder containing volatile components, or a mixture of green coke powder containing volatile components and asphalt powder is provided.

The asphalt powder can assist deposition of the volatile components contained in the green coke powder to form an integral protective layer on the surface of artificial graphite, thereby avoiding agglomeration of artificial graphite particles.

In some embodiments, in step S20, the thermal deposition is carried out at a temperature of 250° C. to 700° C. In some embodiments, the thermal deposition is carried out at a temperature of 500° C. to 700° C.

The purpose of thermal deposition is to make the volatile component contained in the green coke powder be transformed into a protective layer on the surface of artificial graphite, which may modify defect sites on the surface of artificial graphite, reduce specific surface area of artificial graphite, reduce irreversible consumption of active ions and improve first-cycle Coulomb efficiency and cycle life of the secondary batteries.

In some embodiments, in step S30, graphitization is carried out at a temperature of 2800° C. to 3000° C.

Graphitization can effectively eliminate bulk structure defects of artificial graphite, reduce irreversible consumption of active ions against artificial graphite, and improve first-cycle Coulomb efficiency and cycle life of secondary batteries.

In some embodiments, in step S40, discharging is carried out at a temperature of ⩽ 350° C.

By selecting a suitable discharging temperature can reduce the quantity of active groups on the surface of artificial graphite, reduce irreversible consumption of active ion, make artificial graphite have higher first circle Coulomb efficiency, and then make secondary battery have higher first-cycle Coulomb efficiency and longer cycle life.

A third aspect of the present application provides a negative electrode plate, comprising one of the artificial graphite of the first aspect of the present application and the artificial graphite prepared according to the method of the second aspect of the present application.

A fourth aspect of the present application provides a secondary battery comprising at least one of the artificial graphite of the first aspect of the present application, the artificial graphite prepared according to the method of the second aspect of the present application, and the negative electrode plates of the third aspect of the present application.

A fifth aspect of the present application provides a battery module comprising the secondary battery of the fourth aspect of the present application.

A sixth aspect of the present application provides a battery pack comprising one of the secondary battery of the fourth aspect of the present application and the battery module of the fifth aspect of the present application.

A seventh aspect of the present application provides a device comprising at least one of the secondary battery of the fourth aspect of the present application, the battery module of the fifth aspect of the present application, and the battery pack of the sixth aspect of the present application.

The battery modules, battery packs and electrical device in the present application can have the same or similar effect due to the use of the secondary batteries described in the present application.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments. A person of ordinary skill in the art can obtain other drawings based on the drawings without creative work.

DETAILED DESCRIPTION

Figure 1:
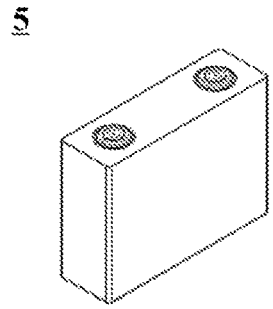
FIG. 1 is a schematic diagram of a secondary battery according to an embodiment of the present application.

Hereinafter, embodiments of the artificial graphite and preparation method thereof, the negative electrode plate, the secondary battery, the battery module, the battery pack, and the electrical device that specifically disclose the present application will be of detail with reference to the accompanying drawings as appropriate. However, unnecessary detailed descriptions may be omitted in some cases, for example the detailed description of a well-known item or the repetitive description of an actual identical structure so as to prevent the following description from becoming unnecessarily redundant and to facilitate understanding by those skilled in the art. In addition, the drawings and the following description are provided for those skilled in the art to fully understand the present application, and are not intended to limit the subject matter of the claims.

The "ranges" disclosed in present application are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present application can be combined with each other to form a new technical solution.

Unless stated otherwise, all technical features and optional technical features of the present application can be combined with each other to form a new technical solution.

Unless stated otherwise, all steps of the present application can be carried out sequentially, and also can be carried out randomly, preferably they are carried out sequentially. For example, the method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transition phases "comprising" and "comprising" mentioned in the present application means that it is drafted in an open mode or in a close mode. For example, the transition phases "comprising" and "comprising" may mean that other components not listed may also be included or contained, or only the listed components may be included or contained.

In the present application herein, unless otherwise stated, the term "or" is inclusive. For example, the phrase "A or B" means A, B, or both A and B". More specifically, either of the following conditions meets "A or B ": A is true (or present) and B is false (or absent); A is false (or absent) and B is true (or present); or both A and B are true (or present).

Artificial Graphite

The key to improving a fast charging capability of secondary batteries is to improve performances of a negative electrode plate and a negative electrode active material. In order to prepare graphite with a high gram capacity and fast charging capability, a process of reducing particle size or providing a carbon coating on the surface of graphite is usually adopted in the prior art. In general, the smaller the particle size of graphite, the better the fast charging performance of graphite is. However, in the prior art, in order to obtain graphite with a small particle size (e.g. Dv50≤16 μm), it is often necessary to increase the pulverizing strength, which will generate more defect sites on the surface of graphite and increase irreversible consumption of active ions. The carbon coating on the surface of graphite is generally made of amorphous carbon such as soft carbon or hard carbon. Such amorphous carbon has low thermal stability, is easy to decompose, and has a large number of active groups on the surface thereof. Therefore, the graphite obtained by the existing process has more electrochemically active sites on the surface thereof and has a strong activity, which increases the irreversible consumption of active ions during the use of secondary batteries, and thus the secondary batteries fail to have higher first-cycle Coulomb efficiency and longer cycle life.

Usually, the smaller the particle size of graphite, the bigger the specific surface area of graphite is, the more electrochemical active site the graphite surface has, the more the irreversible consumption of active ions is, the smaller the first-cycle Coulomb efficiency of secondary battery is, and the shorter the cycle life is. It was unexpectedly found by the inventor(s)(s) that by reasonably controlling the number of electrochemically active sites or active groups on the surface of graphite with smaller particle size, the secondary battery can have a higher first-cycle Coulomb efficiency and longer cycle life under the premise of good fast charging performance.

A first aspect of embodiments of the present application provides an artificial graphite having no amorphous carbon coating layer on its surface and having fast charging capability, which article graphite can enable secondary batteries to have higher first-cycle Coulomb efficiency and longer cycle life. The artificial graphite has a particle size of Dv50⩽16 μm and an air oxidation peak temperature $T_{peak}$ of ⩾830° C., wherein the air oxidation peak temperature $T_{peak}$ of artificial graphite refers to the highest peak temperature of a differential thermo-gravimetric analysis curve obtained when the artificial graphite is subjected to a thermo-gravimetric test having a weighing mass of 10±0.05 mg, with a purging gas of air, an airflow rate of 60 mL/min, and a heating rate of 5° C./min, in a test temperature range of 40° C. to 950° C.

Through a large amount of research, the inventor(s) unexpectedly discovered that the air oxidation peak temperature $T_{peak}$ of artificial graphite is closely related to the number of electrochemical active sites or active groups on the surface of artificial graphite, and the number of electrochemical active sites or active groups on the surface of artificial graphite can be intuitively and accurately reflected by the numerical value of the air oxidation peak temperature $T_{peak}$ of artificial graphite. The higher the air oxidation peak temperature $T_{peak}$ of artificial graphite, the less the number of electrochemically active sites or active groups on the surface of artificial graphite is. It was found by the inventor(s) that the existing artificial graphite with smaller particle size, such as artificial graphite with particle size Dv50⩽16 μm, usually has a large specific surface area and a large number of electrochemically active sites or active groups on the surface thereof and has a relatively small air oxidation peak temperature $T_{peak}$. During the use of secondary batteries, the existing artificial graphite has a high irreversible consumption of active ions, which would be difficult to further improve the first-cycle Coulomb efficiency and cycle life of the secondary batteries.

It was further studied and found by the inventor(s) that when having a particle size of Dv50 ⩽16 μm, and an air oxidation peak temperature $T_{peak}$ of ⩾830° C., the artificial graphite has a moderate number of electrochemical active sites on the surface thereof and thus also moderate activity and irreversible consumption of active ions with the artificial graphite is lower, so that secondary batteries adopting it can have higher first-cycle Coulomb efficiency and longer cycle life under the premise of good fast charging performance.

The artificial graphite having a particle size Dv50 of ⩽16 μm has a good fast charging ability meanwhile, the artificial graphite having an air oxidation peak temperature $T_{peak}$ of ⩾830° C. represents that the quantity of electrochemical active site and active group on the surface of the artificial graphite both are lower, which artificial graphite has a lower irreversible consumption of active ions, and which can enable secondary batteries to have higher first-cycle Coulomb efficiency and longer cycle life.

The artificial graphite does not have amorphous carbon coating layer on the surface thereof, so it has a higher thermal stability.

It was further unexpectedly disclosed by the inventor(s) when the artificial graphite has an air oxidation peak temperature $T_{peak}$ of <830° C., the cycle life of secondary batteries is strongly corrected to the irreversible consumption of active ions with the artificial graphite; and when the artificial graphite has an air oxidation peak temperature $T_{peak}$ of ⩾830° C., the cycle of secondary batteries is weakly related to the irreversible consumption of active ions with the artificial graphite, and the further improvement of performances of the secondary batteries mainly depends on the improvement of positive electrode, separator, electrolyte, and the like.

The advantage of the artificial graphite of the present application can be better embodied in the battery system whose negative electrode active material has a first-cycle Coulomb efficiency less than its positive electrode active material, and in the battery system where the irreversible consumption of active ions with negative electrode active materials dominates its cycle life.

In some embodiments, the air oxidation peak temperature $T_{peak}$ of the artificial graphite can be ⩾830° C., ⩾831° C., ⩾832° C., ⩾833° C., ⩾834° C., ⩾835° C., ⩾836° C., ⩾837° C., ⩾838° C., ⩾839° C., or ⩾840° C.

In some embodiments, the air oxidation peak temperature $T_{peak}$ of the artificial graphite can be in the range of 830° C. to 840° C., 831° C. to 840° C., 832° C. to 840° C., 833° C. to 840° C., 834° C. to 840° C., 835° C. to 840° C., 836° C. to 840° C., 830° C. to 839° C., 831° C. to 839° C., 832° C. to 839° C., 833° C. to 839° C., 834° C. to 839° C., 835° C. to 839° C., 836° C. to 839° C., 830° C. to 838° C., 831° C. to 838° C., 832° C. to 838° C., 833° C. to 838° C., 834° C. to 838° C., 835° C. to 838° C., 830° C. to 837° C., 831° C. to 837° C., 832° C. to 837° C., 833° C. to 837° C., 834° C. to 837° C., 830° C. to 836° C., 831° C. to 836° C., 832° C. to 836° C., or 833° C. to 836° C.

The air oxidation peak temperature $T_{peak}$ of artificial graphite within an appropriate range can enable secondary batteries to have good fast charging performance, higher first-cycle Coulomb efficiency and longer cycle life.

In some embodiments, the particle size Dv50 of the artificial graphite can be ⩽16 μm, ⩽15.7 μm, ⩽15.5 μm, ⩽15.2 μm, ⩽15 μm, ⩽14.7 μm, ⩽14.5 μm, ⩽14.2 μm, ⩽14 μm, ⩽13.7 μm, or ⩽13.5 μm.

In some embodiments, the particle size Dv50 of the artificial graphite can be from 13 μm to 16 μm. In some embodiments, the particle size Dv50 of the artificial graphite may be from 13 μm to 15.5 μm. Further, the particle size Dv50 of the artificial graphite may be from 13.5 μm to 15.5 μm.

The artificial graphite having a particle diameter Dv50 within appropriate range can have higher active ion and electron transport performance and better fast charging performance while having higher powder compaction density.

In some embodiments, the artificial graphite can have a particle size Dv10 of ⩾5 μm. In some embodiments, the particle size Dv10 of the artificial graphite may be from 5 μm to 9 μm. Further, the particle size Dv10 of the artificial graphite may be from 7 μm to 9 μm.

The artificial graphite having a particle diameter Dv10 within appropriate range can have a more suitable specific surface area, so that the irreversible consumption of active ion is lower.

The Dv10 and Dv50 of artificial graphite have known meaning in the art, and can be measured with instruments and methods known in the art. For example, with reference to GB/T 19077.1-2016, a laser particle size analyzer (e.g. Mastersizer 3000) may be used for measurement. Dv10 represents the particle size at which the cumulative volume distribution percentage of material may reach 10%, and Dv50 represents the particle size at which the cumulative volume distribution percentage may reach 50%.

In some embodiments, the artificial graphite can have a specific surface area of 0.8 $m^2/g$ to 1.1 $m^2/g$. In some embodiments, the specific surface area of the artificial graphite may be from 0.95 $m^2/g$ to 1.05 $m^2/g$.

Artificial graphite having a suitable specific surface area can reduce side reaction of electrolytic solution on the surface of artificial graphite, reduce gas production inside secondary batteries, and reduce volume expansion in the cycle process of secondary batteries. Artificial graphite having a suitable specific surface area can also make it have a suitable electrochemical reactivity, so that the negative electrode and secondary battery have high dynamic performance. In addition, the artificial graphite having an appropriate specific surface area can also enable the artificial graphite and binder to have a strong bonding force, improve cohesion and bonding force of the negative electrode plate, and reduce volume expansion of the negative electrode plate during cycle.

The specific surface area of artificial graphite has the known meaning in the art, and can be measured with instruments and methods known in the art. For example, with reference to GB/T 19587-2017, a nitrogen adsorption specific surface area analysis test method is used for testing, and a BET (Brunauer Emmett Teller) method is used for calculation, wherein the nitrogen adsorption specific surface area analysis test can be implemented with a Tri-Star 3020 type specific surface area analysis tester available from Micromeritics company, the United States.

In some embodiments, the artificial graphite can have a tap density of $\geq 1$ $g/cm^3$. In some embodiments, the tap density of the artificial graphite may be from 1.10 $g/cm^3$ to 1.30 $g/cm^3$.

By adopting the artificial graphite having the tap density according to above-mentioned embodiment, the negative electrode plate can have an appropriate porosity and a better electrolyte infiltration performance, so that the secondary battery has longer cycle life. In addition, the artificial graphite having the above-mentioned tap density is beneficial to obtain a higher gram capacity and improve energy density of secondary batteries.

The tap density of artificial graphite has the known meaning in the art, and can be measured with instruments and methods known in the art. For example, with reference to GB/T 5162-2006, a powder tap density tester (such as Dandong Baxter BT-301) is used for testing.

In some embodiments, the artificial graphite has a powder compaction density of $\geq 1.6$ $g/cm^3$ under a force of 20000 N. In some embodiments, the powder compaction density of the artificial graphite may be from 1.6 $g/cm^3$ to 1.85 $g/cm^3$ under a force of 20000N.

In some embodiments, the artificial graphite has a powder compaction density of $\geq 1.7$ $g/cm^3$ under a force of 20000 N. In some embodiments, the powder compaction density of the artificial graphite may be from 1.7 $g/cm^3$ to 2.0 $g/cm^3$ under a force of 20000N.

By adopting the powder compaction density according to the above-mentioned embodiment, the artificial graphite can be made to have a higher gram capacity. Thus, the negative electrode plate using the artificial graphite also has a higher compaction density, and the corresponding secondary battery also has a higher energy density.

The powder compaction density of artificial graphite has the known meaning in the art, and can be measured with instruments and methods known in the art. For example, with reference to GB/T 25 24533-2009, an electronic pressure testing machine (such as UTM7305) is used for testing. For example, a certain amount of powder is put on a special mold for compaction, different pressures are set, and then the powder thickness under different pressures may be read on the machine so that the compaction density under different pressures can be calculated.

In some embodiments, the artificial graphite may have a gram capacity of $\geq 353$ mAh/g. In some embodiments, the gram capacity of the artificial graphite may be from 353 mAh/g to 360 mAh/g.

In some embodiments, the artificial graphite can have a first-cycle Coulomb efficiency of $\geq 95\%$. In some embodiments, the first-cycle Coulomb efficiency of the artificial graphite may be $\geq 95.3\%$.

Preparation of Artificial Graphite

A second aspect of the present application provides a method for preparing artificial graphite, the method comprising the steps: S10, providing green coke powder containing volatile components, S20, carrying out thermal deposition to the green coke powder so as to make at least part of the volatile components contained in the green coke powder to be deposited on the surface of the green coke powder, S30, carrying out graphitization to the green coke powder that has been subjected to the thermal deposition, S40, carrying out cooling and discharging to obtain the artificial graphite having a particle size Dv50 of $\leq 16$ μm, and an air oxidation peak temperature $T_{peak}$ of $\geq 830°$ C., wherein the air oxidation peak temperature $T_{peak}$ of artificial graphite refers to the highest peak temperature of a differential thermo-gravimetric analysis curve obtained when the artificial graphite is subjected to a thermo-gravimetric test having a weighing mass of 10±0.05 mg, with a purging gas of air, an airflow rate of 60 mL/min, and a heating rate of 5° C./min, in a test temperature range of 40° C. to 950° C.

By the method for preparing artificial graphite of the present application, the artificial graphite having low irreversible consumption of active ions on its surface, being free of amorphous carbon coating layer and having fast charging capability can be obtained.

In some embodiments, in step S10, the green coke powder as provided may contain volatile components in a mass content of $\geq 8.5\%$. In some embodiments, the green coke powder as provided may contain volatile components in a mass content of 9% to 10.5%. When the green coke powder has a high content of volatile components, the volatile components can deposit on the surface of artificial graphite as prepared and form an integral protective layer, and the protective layer can fully modify defect sites on the surface of artificial graphite, reduce specific surface area of artificial graphite, reduce irreversible consumption of active ions and improve first-cycle Coulomb efficiency and cycle life of the secondary battery.

In some embodiments, in step S10, the green coke powder as provided may have a particle size Dv10 of $\geq 3.0$ μm. The particle size Dv10 of green coke powder within a suitable range can reduce the content of fine powder in the green coke powder and reduce irreversible consumption of active ions with artificial graphite.

In some embodiments, in step S10, the green coke powder as provided has a particle size Dv50 of ⩽16 μm. The particle size Dv50 of green coke powder within a suitable range can make sure that the artificial graphite as prepared has good fast charging performance.

In some embodiments, in step S10, the green coke powder having Dv10⩾3.0 μm, Dv50⩽16 μm is provided.

In some embodiments, in step S10, providing the green coke powder containing volatile components comprises the substeps of carrying out coking treatment to green coke raw material to obtain green coke, and pulverizing the green coke to obtain green coke powder.

"Green coke raw material" refers to the component that can be processed to obtain "green coke", i.e. a starting material for preparing green coke. In some embodiments, the green coke raw material may be one or more selected from petroleum-based raw materials and coal-based raw materials. As an example, the petroleum-based raw material is one or more selected from heavy oil, residual oil, and vacuum residual oil, and the coal-based raw material is mainly selected from coal tar asphalt. Among them, heavy oil, residual oil and vacuum residual oil are usually produced in petroleum refining process, and coal tar asphalt is usually produced in coal carbonization process. "Green coke" refers to the lumpy product obtained by coking green coke raw materials. "Green coke" and "green coke powder" are completely consistent in composition, and comprise the same amount of volatile components with the exception that their particle sizes are different. "Green coke powder" is obtained by milling green coke.

In some embodiments, the coking treatment of green coke raw material is carried out in a delayed coking unit. The delayed coking unit includes a heating furnace and a coke drum. The delayed coking process refers to such a process that the green coke raw materials are quickly heated to the required coking temperature in a heating furnace, and then fed into a coke drum where a preheating process and a coke cooling process are carried out, thereby producing green coke.

In some embodiments, the coking treatment to green coke raw material is carried out at a temperature of ⩽550° C. Further, the coking treatment to green coke raw material is carried out at a temperature of 450° C. to 550° C. Selecting an appropriate coking temperature is beneficial to obtaining green coke with a high content of volatile components. In addition, too high coking treatment temperature will increase brittleness of green coke, and it is more likely to produce fine powder when green coke is pulverized to prepare green coke powder.

In some embodiments, the preheating process may be carried out for a period of ⩾5 h during the coking treatment to green coke raw material. Selecting an appropriate preheating period can reduce bulk structural defects of the obtained green coke. Too short preheating period will cause the obtained green coke to have more bulk structural defects, and when the green coke is pulverized, the resulting green coke powder will be more easily broken, and exhibit more defects. At the same time, too short preheating period will increase the number of irreversible de-intercalation sites of active ions inside the green coke powder particles, increase irreversible consumption of active ions with artificial graphite, and reduce first-cycle Coulomb efficiency and cycle life of secondary batteries.

In some embodiments, the coke cooling process may be carried out for a period of ⩾5 h.

In some embodiments, the pulverizing step is carried out with a mechanical pulverizing equipment. Further, a mechanical pulverizing equipment with an impact hammer grinding discs is used for pulverizing. Generally, when particles are pulverized, roller pulverizing equipment or mechanical pulverizing equipment can be used where the roller pulverizing equipment crushes lumpy green coke by extrusion to obtain green coke powder. However, the green coke powder obtained by extrusion has many defect sites on the surface, and the extruded green coke powder particles is easy to internal cracking, and the green coke powder also has many bulk structural defects. In addition, the green coke powder obtained by extrusion has a high content of fine powder, and the irreversible consumption of active ions is also increased due to the existence of a large number of defect sites on the surface of the fine powder. The mechanical pulverizing equipment is to make lumpy green coke broken to obtain green coke powder by the mode of collision, and during the collision, particles of green coke powder having an irregular shape can be polished, so that the green coke powder particles are transformed from an irregular shape to a spherical shape, thereby reducing surface defect sites of artificial graphite and reducing irreversible consumption of active ions.

In some embodiments, in step S10, green coke powder containing volatile components, or a mixture of green coke powder containing volatile components and asphalt powder is provided. The asphalt powder can assist deposition of the volatile components contained in the green coke powder to form an integral protective layer on the surface of artificial graphite, thereby avoiding soft agglomeration of artificial graphite particles. After the artificial graphite particles are softly agglomerated, the softly agglomerated artificial graphite particles will unravel under the action of pressure during the cold pressing of the negative electrode plate. This process will increase the number of electrochemically active sites on the surface of artificial graphite and increase consumption of active ions. Thus, the first-cycle Coulomb efficiency and cycle life of secondary batteries are reduced.

In some embodiments, the particle size Dv50 of the asphalt powder is less than the particle size Dv50 of the green coke powder. Thus, a plurality of asphalt powders may be attached on each green coke powder on average, and the contact area between the asphalt powder and the green coke powder is small. Thus, the asphalt powder has a weak bonding effect on the green coke powder after being softened by heat, which will not affect evaporation of volatile components of the green coke powder and its deposition on the surface of green coke powder particles. When the particle size of the asphalt powder is large, a plurality of green coke powders will share one asphalt powder. After the asphalt powder is softened by heating, its contact area with the green coke powder is large, and their bonding effect is strong, which will hinder evaporation of volatile components of the green coke powder and its deposition on the surface of green coke powder particles.

In some embodiments, based on the mass of the green coke powder, the asphalt powder can be present in a mass percentage content of ⩽5%. Further, the mass percentage content of the asphalt powder may be less than or equal to 2%.

In some embodiments, the asphalt powder can have a softening point of ⩽250° C. Further, the softening point of the asphalt powder may be ⩽200° C. Softening point of asphalt is the ⩽ temperature at which it is softened and sags when heated, which indicates the temperature stability of asphalt to a certain extent. By selecting an asphalt powder with a suitable softening point can prevent the green coke powder from sticking or agglomerating together.

A softening point test of asphalt powder can refer to GB/T 4507-2014.

In some embodiments, in step S20, the thermal deposition is carried out at a temperature of 250° C. to 700° C. In some embodiments, the thermal deposition is carried out at a temperature of 500° C. to 700° C.

The purpose of thermal deposition is to make the volatile component contained in the green coke powder be transformed into a protective layer on the surface of artificial graphite, which may modify defect sites on the surface of artificial graphite, reduce specific surface area of artificial graphite, reduce irreversible consumption of active ions and improve first-cycle Coulomb efficiency and cycle life of the secondary batteries.

In some embodiments, the thermal deposition may be performed in stages. For example, thermal deposition is carried out by firstly raising temperature to a lower temperature (such as 250° C. to 450° C., In some embodiments 350° C. to 450° C.) for a period of time to deposit volatile components of the green coke powder; then continues by raising the temperature to a higher temperature (such as 500° C.~700° C.) to ensure that the volatile components of the green coke powder that may not be thermally deposited are completely volatilized and prevent the prepared artificial graphite from soft agglomeration or adhesion.

In some embodiments, in step S20, the thermal deposition may be carried out for a period of ⩾1 h. In some embodiments, the thermal deposition period may be 1 h to 3 h.

In some embodiments, in step S20, the thermal deposition can be carried out in a vertical stirred tank, a horizontal stirred tank, and a horizontal drum furnace. The thermal deposition can be carried out by heating and with stirring, which is favorable for sufficient deposition of volatile components of the green coke powder.

In some embodiments, in step S30, the graphitization may be carried out at a temperature of 2800° C. to 3000° C. Graphitization can effectively eliminate bulk structure defects of artificial graphite, reduce irreversible consumption of active ions against artificial graphite, and improve first-cycle Coulomb efficiency and cycle life of secondary batteries.

In some embodiments, in step S30, the graphitization may be carried out for a period of 6 h to 8 h.

In some embodiments, in step S30, the graphitization can be carried out in an Acheson graphitization equipment.

In some embodiments, in step S40, the discharging may be carried out at a temperature of ⩽350° C. When the discharging temperature is high, a large number of active groups such as dangling bonds will be generated on the surface of artificial graphite under the action of air oxidation, which will reduce the first-cycle Coulomb efficiency of artificial graphite and secondary battery. By selecting a suitable discharging temperature can reduce the quantity of active groups on the surface of artificial graphite, reduce irreversible consumption of active ion, make artificial graphite have higher first-cycle Coulomb efficiency, and then make secondary battery have higher first-cycle Coulomb efficiency and longer cycle life.

In some embodiments, the ratio of the particle size Dv50 of the green coke powder provided by step S10 and the particle size Dv50 of the artificial graphite obtained by step S40 can be ⩾0.85. In some embodiments, the ratio of the particle size Dv50 of the green coke powder provided by step S10 and the particle size Dv50 of the artificial graphite obtained by step S40 may be from 0.85 to 0.95. As such, it can be ensured that the prepared artificial graphite does not have obvious adhesion or agglomeration.

In some embodiments, the ratio of the specific surface area of the green coke powder provided by step S10 and the specific surface area of the artificial graphite obtained by step S40 can be ⩾1.5. In some embodiments, the ratio of the specific surface area of the green coke powder provided by step S10 and the specific surface area of the artificial graphite obtained by step S40 can be ⩾1.76. As such, it can be ensured to sufficiently deposit the volatile components of the green coke powder to modify the defect sites on the surface of artificial graphite.

In some embodiments, a method for preparing artificial graphite can comprise the steps of: providing green coke powder containing volatile components in an amount content of ⩾8.5%, In some embodiments containing volatile components in an amount content of 9% to 10.5%; carrying out thermal deposition to the green coke powder at a temperature of 250° C. to 700° C., In some embodiments 500° C. to 700° C. so as to make at least part of the volatile components contained in the green coke powder to be deposited on the surface of the green coke powder; carrying out graphitization to the green coke powder that has been subjected to the thermal deposition, at a temperature of 2800° C. to 3000° C.; and cooling to a temperature of ⩽350° C. and discharging the product to obtain the artificial graphite having a particle size Dv50 of ⩽16 μm, and an air oxidation peak temperature $T_{peak}$ of ⩾830° C.

In some embodiments, a method for preparing artificial graphite can comprise the steps of: providing green coke powder containing volatile components in an amount content of ⩾8.5% and having Dv10⩾3.0 μm and Dv50⩽16 μm; carrying out thermal deposition to the green coke powder at a temperature of 250° C. to 700° C., In some embodiments 500° C. to 700° C. so as to make at least part of the volatile components contained in the green coke powder to be deposited on the surface of the green coke powder; carrying out graphitization to the green coke powder that has been subjected to the thermal deposition, at a temperature of 2800° C. to 3000° C.; and cooling to a temperature of ⩽350° C. and discharging the product to obtain the artificial graphite having a particle size Dv50 of ⩽16 μm, and an air oxidation peak temperature $T_{peak}$ of ⩾830° C.

Secondary Battery

A secondary battery, called a rechargeable battery or an accumulator, refers to a battery that can continue to be used by activating its active material by means of charging after it is discharged.

Typically, a secondary battery includes a positive electrode plate, a negative electrode plate, a separator, and an electrolyte. During charging and discharging processes of the battery, active ions are intercalated and de-intercalated back and forth between the positive electrode plate and the negative electrode plate. The separator is arranged between the positive electrode plate and the negative electrode plate, and mainly functions as preventing short circuit of the positive and negative electrode while allowing active ions to pass through. The electrolyte functions as conducting active ions between the positive electrode plate and the negative electrode plate.

[Negative Electrode Plate]

In the secondary battery of the present application, the negative electrode plate includes a negative electrode current collector and a negative electrode film layer disposed on at least one surface of the negative electrode current collector. For example, the negative electrode current collector has two opposite surfaces in its thickness direction, and the negative electrode film layer is provided on either or both of the two opposite surfaces of the negative electrode current collector.

In the secondary battery of the present application, the negative electrode film layer usually comprises a negative electrode active material, an optional binder, an optional conductive agent and other optional auxiliary agents. The negative electrode film layer is usually formed by coating a negative electrode slurry on the negative electrode current collector followed by drying and cold pressing. The negative electrode slurry is usually formed by dispersing the negative electrode active material, the optional conductive agent, the optional binder, and the other optional auxiliary agents in a solvent with stirring uniformly. The solvent may be N-methyl pyrrolidone (NMP) or deionized water, but is not limited thereto.

In the secondary battery of the application, the negative electrode active material can include one of the artificial graphite of the first aspect of the embodiment of the application and the artificial graphite prepared by the method of the second aspect of the embodiment of the application.

In the secondary battery of the present application, the negative electrode active material may also include other negative electrode active materials for secondary batteries known in the art. As an example, other negative active materials may include one or more of natural graphite, soft carbon, hard carbon, silicon-based materials, tin-based materials, and lithium titanate. The silicon-based material may include one or more of elemental silicon, silicon oxide, silicon-carbon composite, silicon-nitrogen composite, and silicon alloy materials. The tin-based material may include one or more of elemental tin, tin oxide, and tin alloy materials. The present application is not limited to these materials, and other conventionally known materials that can be used as negative electrode active materials for secondary batteries can also be used. These other negative electrode active materials may be used alone or in combination of two or more.

As an example, the conductive agent may include one or more of superconducting carbon, acetylene black, carbon black, Ketjen black, carbon dots, carbon nanotubes, graphene, and carbon nanofibers. As an example, the binder may include one or more of styrene-butadiene rubber (SBR), water-soluble unsaturated resin SR-1B, water-based acrylic resin (e.g., polyacrylic acid PAA, polymethacrylic acid PMAA, sodium polyacrylate PAAS), polyacrylamide (PAM), polyvinyl alcohol (PVA), sodium alginate (SA), and carboxymethyl chitosan (CMCS). Other optional adjuvants may include thickeners (e.g., sodium carboxymethyl cellulose CMC-Na), PTC thermistor materials, and the like.

In the secondary battery of the present application, a metal foil or a composite current collector can be used as the negative electrode current collector. As an example of the metal foil, a copper foil can be used. The composite current collector may include a polymer material base layer and a metal material layer formed on at least one surface of the polymer material base layer. As an example, the metal material may be one or more selected from copper, copper alloy, nickel, nickel alloy, titanium, titanium alloy, silver, and silver alloy. As an example, the polymer material base layer may be selected from polypropylene (PP), polyethylene terephthalate (PET), polybutylene terephthalate (PBT), polystyrene (PS), polyethylene (PE) and the like.

[Positive Electrode Plate]

In the secondary battery of the present application, the positive electrode plate includes a positive electrode current collector and a positive electrode film layer disposed on at least one surface of the positive electrode current collector and comprising a positive electrode active material. For example, the positive electrode current collector has two opposite surfaces in its thickness direction, and the positive electrode film layer is provided on either or both of the two opposite surfaces of the positive electrode current collector.

In the secondary battery of the present application, the positive electrode active material may adopt positive electrode active materials known in the art for secondary batteries. As an example, the positive active material may comprise one or more of lithium transition metal oxides, olivine-structured lithium-containing phosphates, and their respective modified compounds. Examples of lithium transition metal oxides may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide and their respective modified compounds. Examples of olivine-structured lithium-containing phosphates may include, but are not limited to, one or more of lithium iron phosphate, composites of lithium iron phosphate with carbon, lithium manganese phosphate, composites of lithium manganese phosphate with carbon, lithium iron manganese phosphate, composites of lithium iron manganese phosphate with carbon and their respective modified compounds. The present application is not limited to these materials, and other conventionally known materials that can be used as positive electrode active materials for secondary batteries can also be used.

In some embodiments, in order to further improve energy density of the secondary battery, the positive electrode active material can include one or more of the lithium transition metal oxide as shown in formula 1 and its modified compounds.

$$Li_aNi_bCo_cM_dO_eA_f \qquad \text{Formula 1}$$

In Formula 1, $0.8 \leq a \leq 1.2$, $0.5 \leq b < 1$, $0 < c < 1$, $0 < d < 1$, $1 \leq e \leq 2$, $0 \leq f \leq 1$, M is one or more selected from Mn, Al, Zr, Zn, Cu, Cr, Mg, Fe, V, Ti and B, and A is one or more selected from N, F, S and Cl.

In the present application, the modified compound of each of the above-mentioned materials can be obtained by modifying the positive electrode active material by doping or surface coating.

In the secondary battery of the present application, the positive electrode film layer generally includes a positive electrode active material and an optional binder and an optional conductive agent. The positive electrode film layer is usually formed by applying a positive electrode slurry on the positive electrode current collector, drying and cold pressing. The positive electrode slurry is usually formed by dispersing a positive electrode active material, an optional conductive agent, an optional binder and any other components in a solvent with stirring uniformly. The solvent may be N-methylpyrrolidone (NMP), but is not limited thereto. As an example, the binder for the positive electrode film layer may include one or more of polyvinylidene fluoride (PVDF), polytetrafluoroethylene (PTFE), vinylidene fluoride-tetrafluoroethylene-propylene terpolymer, vinylidene fluoride-hexafluoroethylene propylene-tetrafluoroethylene terpolymer, tetrafluoroethylene-hexafluoropropylene copolymer, and fluorine-containing acrylate resin.

In the secondary battery of the present application, a metal foil or a composite current collector can be used as the positive electrode current collector. As an example of the metal foil, an aluminum foil can be used. The composite current collector may include a polymer material base layer and a metal material layer formed on at least one surface of the polymer material base layer. As an example, the metal material may be one or more selected from aluminum, aluminum alloy, nickel, nickel alloy, titanium, titanium alloy, silver, and silver alloy. As an example, the polymer material base layer may be selected from polypropylene (PP), polyethylene terephthalate (PET), polybutylene terephthalate (PBT), polystyrene (PS), polyethylene (PE) and the like.

[Electrolyte]

In the secondary battery of the present application, the type of electrolyte is not specifically limited, which can be selected according to requirements. For example, the electrolyte may be at least one selected from solid electrolytes and liquid electrolytes (i.e., electrolytic solution).

In some embodiments, the electrolyte is used in the form of an electrolytic solution. The electrolytic solution comprises an electrolyte salt and a solvent.

In the present application, the type of electrolyte salt is not specifically limited, and can be selected according to needs. In some embodiments, as an example, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorobisoxalate phosphate) and LiTFOP (lithium tetrafluorooxalate phosphate).

In the present application, the type of solvent is not specifically limited, and can be selected according to needs. In some embodiments, as an example, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA)), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolytic solution may In some embodiments comprise additives. For example, the additives may include negative electrode film-forming additives, positive electrode film-forming additives, and may further include those additives that can improve certain performance of batteries, such as those additives to improve battery overcharge performance, those additives to improve battery high temperature performance, and those additives to improve battery low temperature performance and the like.

[Separator]

In secondary batteries using an electrolytic solution and some secondary batteries using a solid electrolyte, a separator is also included. The separator is arranged between the positive electrode plate and the negative electrode plate for isolation. There is no particular limitation on the type of separator in the present application, and any well-known porous-structure separator with good chemical stability and mechanical stability can be selected. In some embodiments, the material of the separator can be one or more selected from glass fiber, non-woven fabric, polyethylene, polypropylene and polyvinylidene fluoride. The separator can be a single-layer film or a multi-layer composite film. When the separator is a multi-layer composite film, the materials of each layer are the same or different.

In some embodiments, the positive electrode plate, the separator and the negative electrode plate can be made into an electrode assembly by a winding process or a lamination process.

In some embodiments, the secondary battery includes an outer package. The outer package is used to encapsulate the electrode assembly and the electrolyte.

In some embodiments, the outer package of the secondary battery may be a hard case, such as a hard plastic case, an aluminum case, a steel case, and the like. The outer package of the secondary battery may also be a soft package, such as a pouch-type soft package. Material of the soft bag can be plastic, such as one or more of polypropylene (PP), polybutylene terephthalate (PBT), and polybutylene succinate (PBS).

The shape of the secondary battery is not particularly limited in the present application, and it may be cylindrical, square or any other shape. FIG. 1 is a schematic diagram of a secondary battery 5 of a square structure as an example.

Figure 2:
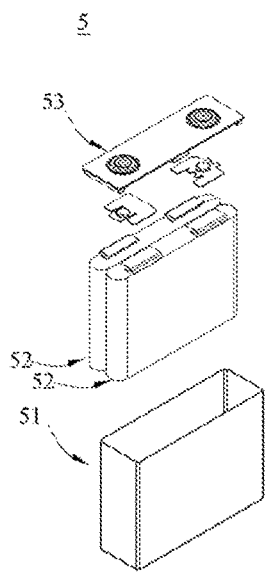
FIG. 2 is an exploded view of a secondary battery according to an embodiment of the present application.

In some embodiments, as shown in FIG. 2, the outer package may include a casing 51 and a cover plate 53, wherein the casing 51 may include a bottom plate and side plates connected to the bottom plate, and the bottom plate and the side plates are enclosed to form an accommodating cavity. The casing 51 has an opening communicating with the accommodating cavity, and the cover plate 53 is used to cover the opening to close the accommodating cavity. An electrode assembly 52 is formed by a positive electrode plate, a negative electrode plate and a separator by a winding process or a lamination process. The electrode assembly 52 is packaged in the accommodating cavity, and the electrolyte is infiltrated in the electrode assembly 52. The number of electrode assemblies 52 contained in the secondary battery 5 may be one or several, and may be adjusted according to requirements.

In some embodiments, the secondary battery can be assembled into a battery module, the number of secondary batteries contained in the battery module can be multiple, and the specific number can be adjusted according to the application and capacity of the battery module.

Figure 3:
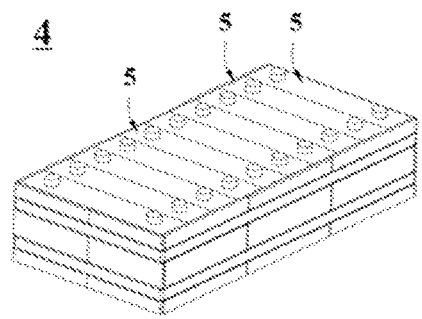
FIG. 3 is a schematic diagram of a battery module according to an embodiment of the present application.

FIG. 3 is a battery module 4 as an example. As shown in FIG. 3, in the battery module 4, a plurality of secondary batteries 5 may be arranged in sequence along the longitudinal direction of the battery module 4. Of course, they can also be arranged in any other manner. Furthermore, a plurality of secondary batteries 5 can be fixed with fasteners.

In some embodiments, the battery module 4 may further include a housing having an accommodating space in which a plurality of secondary batteries 5 are accommodated.

In some embodiments, the above-mentioned battery modules can also be assembled into a battery pack, and the number of battery modules included in the battery pack can be adjusted according to the present application and capacity of the battery pack.

Figure 4:
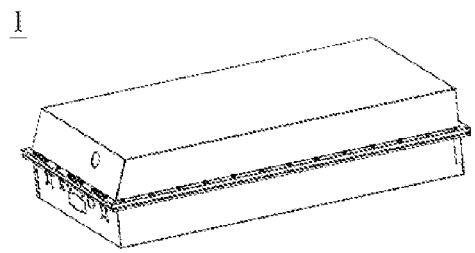
FIG. 4 is a schematic diagram of a battery pack according to an embodiment of the present application.
Figure 5:
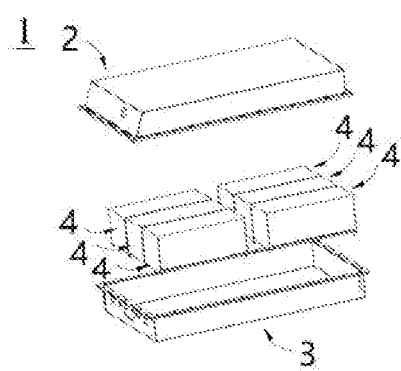
FIG. 5 is an explored view of FIG. 4.

FIGS. 4 and 5 are a battery pack 1 as an example. As shown in FIGS. 4 and 5, the battery pack 1 may include a battery case and a plurality of battery modules 4 provided in the battery case. The battery case includes an upper case body 2 and a lower case body 3, and the upper case body 2 is used to cover the lower case body 3 to form a closed space for accommodating the battery modules 4. A plurality of battery modules 4 may be arranged in the battery case in any manner.

The preparation method of the secondary battery of the present application is known. In some embodiments, a positive electrode plate, a separator, a negative electrode plate, and an electrolytic solution may be assembled to form a secondary battery. As an example, a positive electrode plate, a separator, and a negative electrode plate can be formed into an electrode assembly through a winding process or a lamination process and the electrode assembly is placed in an outer package where an electrolytic solution is injected after drying. Through vacuum encapsulation, standing, formation, and shaping, the secondary battery is obtained.

Electrical Device

Embodiments of the present application also provide an electrical device comprising at least one of the secondary battery, battery module, or battery pack of the present application. The secondary battery, battery module or battery pack can be used as a power source of the electrical device, and can also be used as an energy storage unit of the electrical device. The electrical device can be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The electrical device can select a secondary battery, a battery module or a battery pack according to its usage requirements.

Figure 6:
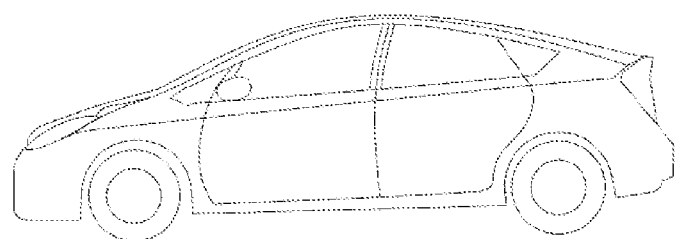
FIG. 6 is a schematic diagram of an electrical device according to an embodiment of the present application using the secondary battery of the present application as power.
Figure 7:
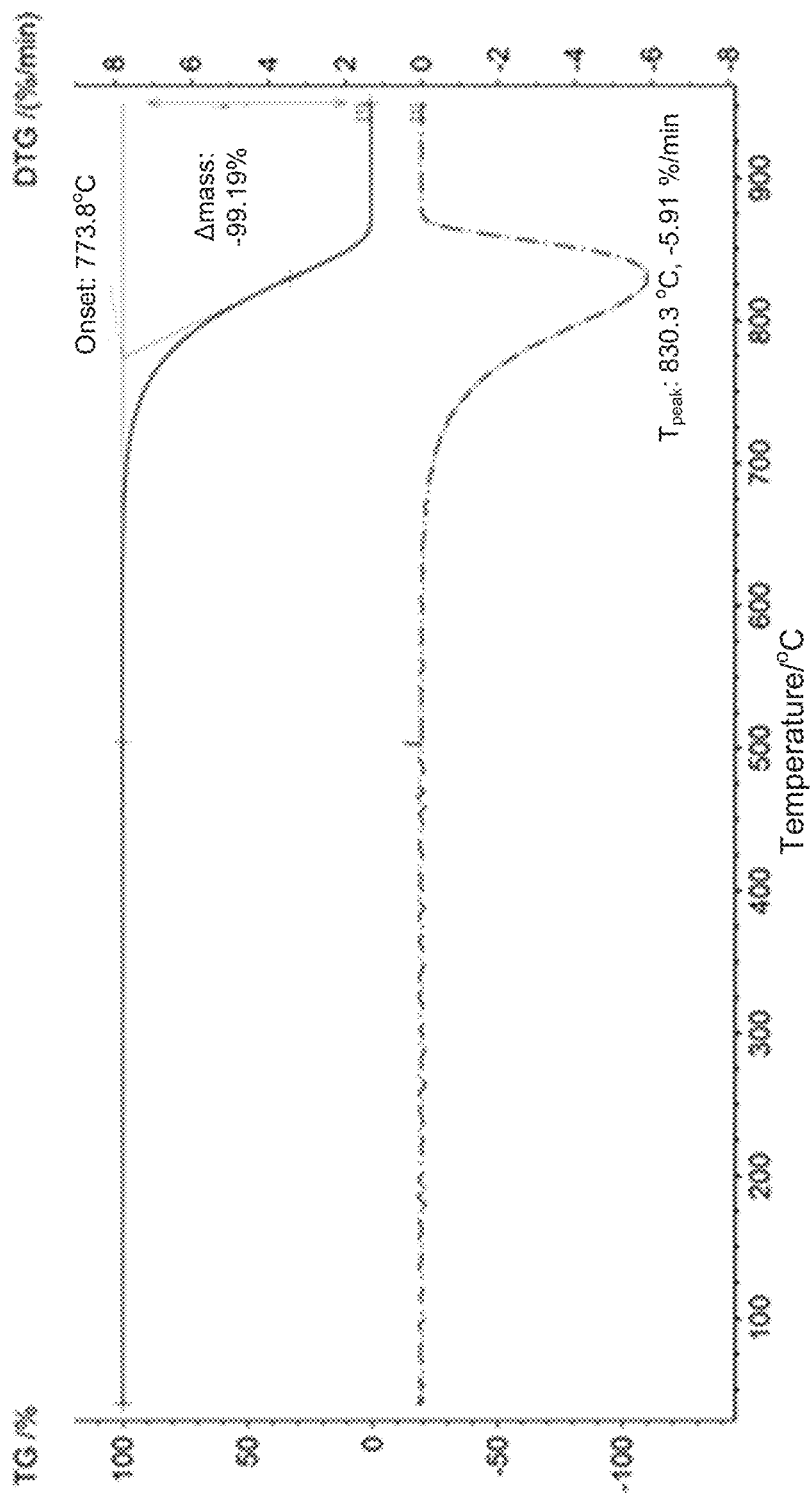
FIG. 7 illustrates a differential thermo-gravimetric analysis curve of the artificial graphite prepared according to Example 1 of the present disclosure.
Figure 8:
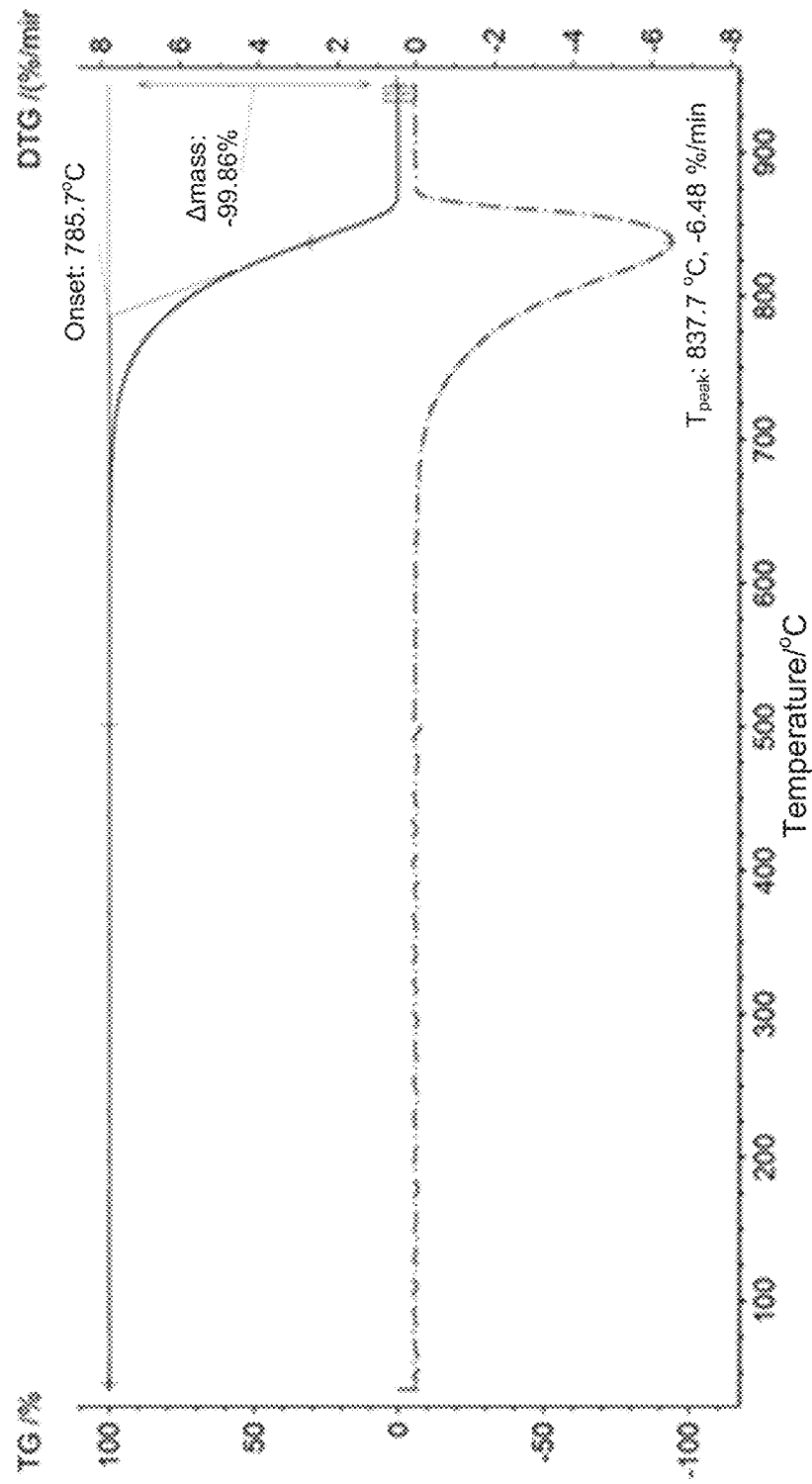
FIG. 8 illustrates a differential thermo-gravimetric analysis curve of the artificial graphite prepared according to Example 2 of the present disclosure.
Figure 9:
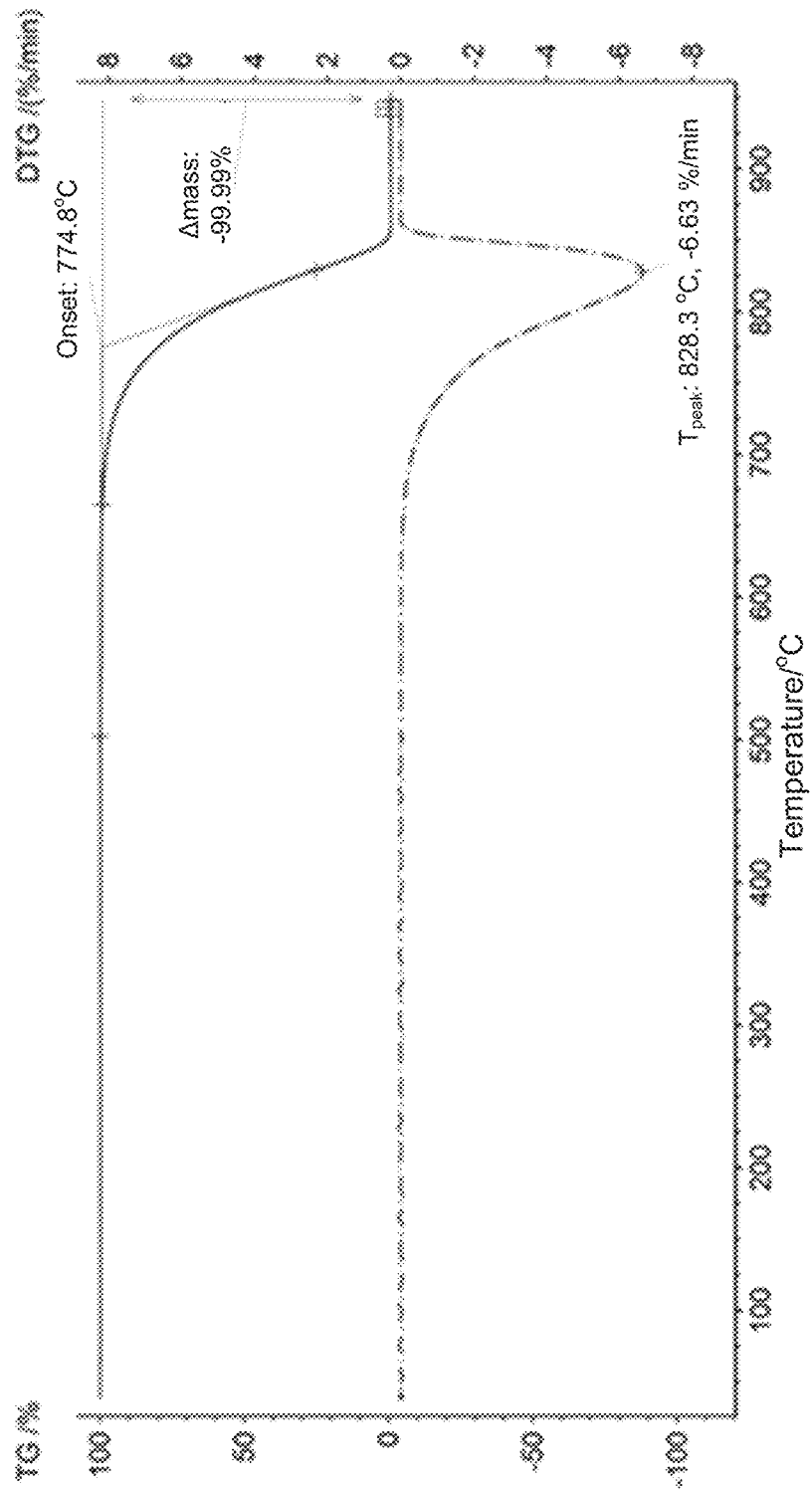
FIG. 9 illustrates a differential thermo-gravimetric analysis curve of the artificial graphite prepared according to Comparative Example 1 of the present disclosure.
Figure 10:
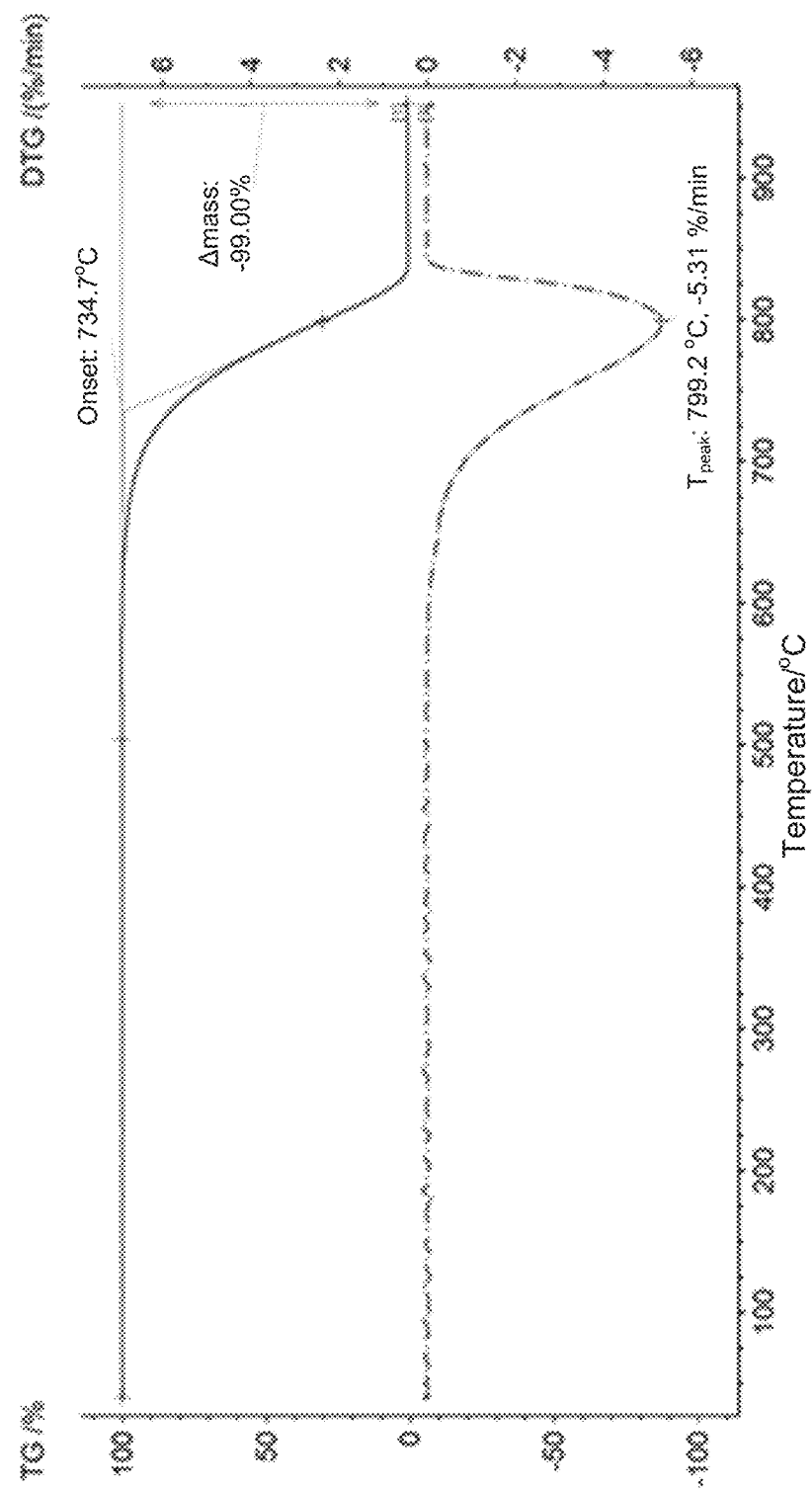
FIG. 10 illustrates a differential thermo-gravimetric analysis curve of the artificial graphite prepared according to Comparative Example 3 of the present disclosure.

FIG. 6 is 6 an electrical device as an example. The electrical device is a pure electric vehicle, a hybrid electric vehicle, or a plug-in hybrid electric vehicle. In order to meet high power and high energy density requirements of the electrical device, a battery pack or a battery module can be used.

As another example, the electrical device may be a mobile phone, a tablet computer, a notebook computer, and the like. The electric device is generally required to be light and thin, and a secondary battery can be used as a power source.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios of the following examples are based on weight, all reagents used in the examples are commercially available or synthesized according to conventional methods and can be directly used without further treatment, and all instruments used in the examples are commercially available.

Example 1

(1) Preparation of Artificial Graphite

A petroleum-based raw material was subjected to a delayed coking process at 500° C., including a preheating prepares for 6 h, and a coke cooling process for 6 h, thereby obtaining a petroleum-based non-needle green coke having a volatile component content of 10.2%. A mechanical pulverizing equipment with an impact hammer mill was used to break the lumpy green coke into green coke powder that was controlled to have a particle size Dv10 of 3.0 μm, a particle size Dv50 of 13.0 μm, and a specific surface area of 1.93 m²/g. The green coke powder was placed in a horizontal stirred tank and heated to 650° C. and kept for 1 h to deposit the volatile components contained in the green coke powder. The deposited green coke powder was placed in a graphite crucible, then the graphite crucible was placed in an Acheson graphitization furnace, where resistance materials were filled around the graphite crucible. The resistance material were heated by power on to make the current flow through to generate heat energy, in which the temperature inside the graphite crucible reached 2800° C. and was kept for 8 hours, so that the green coke powder was graphitized. The temperature was naturally cooled until the surface temperature of the graphite crucible was lower than 300° C., thereby obtaining artificial graphite.

(2) Preparation of Negative Electrode Plate

The artificial graphite of above-mentioned preparation as a negative electrode active material, with acetylene black as a conductive agent, styrene-butadiene rubber (SBR) as a binding agent, and sodium carboxymethyl cellulose (CMC-Na) as a thickener were mixed at a mass ratio of 96:1:1:1, to which deionized water as a solvent was added. Through fully stirring according to methods known in the art, a negative electrode slurry was obtained. The negative electrode slurry was evenly applied on a negative electrode current collector copper foil, and dried to obtain a negative electrode film layer. After cold pressing process, the negative electrode plate was obtained.

(3) Preparation of Positive Electrode Plate

Lithium iron phosphate as a positive electrode active material, polyvinylidene fluoride as a binder, acetylene black as a conductive agent were mixed at a mass ratio 97:2:1, to which N-methylpyrrolidone (NMP) as a solvent to adjust its viscosity. Through fully stirring according to methods known in the art, a positive electrode slurry was obtained. The positive electrode slurry was evenly applied on a positive electrode current collector aluminum copper foil, and dried to obtain a positive electrode film layer. After cold pressing process, the positive electrode plate was obtained.

(4) Preparation of Electrolytic Solution

In an argon atmosphere glove box with a water content<10 ppm, ethylene carbonate (EC) and propylene carbonate (PC) at an equal volume were mixed homogeneously, to obtain organic solvent, then the LiPF was homogeneously dissolved in the above-mentioned organic solvent at 1 mol/L, to obtain an electrolytic solution.

(5) Preparation of Separator

A polyethylene (PE) film was used as a separator.

(6) Preparation of Secondary Battery

The positive electrode plate, separator, negative electrode plate were stacked and wound in order to obtain an electrode assembly; and the electrode assembly was added to aluminum plastic film as an outer packaging, to which the electrolytic solution was injected after drying. Through encapsulation, standing, forming, aging, secondary packaging, capacity testing and other processes, the secondary battery was obtained.

Example 2

The preparation method of secondary battery was similar to example 1, with the exception that the preparation process of artificial graphite (step 1) was different, specifically comprising the following steps.

A petroleum-based raw material was subjected to a delayed coking process at 500° C., including a preheating prepares for 6 h, and a coke cooling process for 6 h, thereby obtaining a petroleum-based non-needle green coke having a volatile component content of 10.2%. A mechanical pulverizing equipment with an impact hammer mill was used to break the lumpy green coke into green coke powder that was controlled to have a particle size Dv10 of 3.2 µm, a particle size Dv50 of 13.2 µm, and a specific surface area of 1.83 m$^2$/g. The green coke powder was placed in a horizontal stirred tank and heated to 650° C. and kept for 1 h to deposit the volatile components contained in the green coke powder. The deposited green coke powder was placed in a graphite crucible, then the graphite crucible was placed in an Acheson graphitization furnace, where resistance materials were filled around the graphite crucible. The resistance material were heated by power on to make the current flow through to generate heat energy, in which the temperature inside the graphite crucible reached 2800° C. and was kept for 8 hours, so that the green coke powder was graphitized. The temperature was naturally cooled until the surface temperature of the graphite crucible was lower than 300° C., thereby obtaining artificial graphite.

Example 3

The preparation method of secondary battery was similar to example 1, with the exception that the preparation process of artificial graphite (step 1) was different, specifically comprising the following steps.

A petroleum-based raw material was subjected to a delayed coking process at 500° C., including a preheating prepares for 6 h, and a coke cooling process for 6 h, thereby obtaining a petroleum-based non-needle green coke having a volatile component content of 10.2%. A mechanical pulverizing equipment with an impact hammer mill was used to break the lumpy green coke into green coke powder that was controlled to have a particle size Dv10 of 3.2 µm, a particle size Dv50 of 13.2 µm, and a specific surface area of 1.83 m$^2$/g. 2% coal-based asphalt powder having a softening point of 250° C., and a particle size Dv50 of 3 µm was add to the above green coke powder. The green coke powder was placed in a horizontal stirred tank and heated to 650° C. and kept for 1 h to deposit the volatile components contained in the green coke powder. The deposited green coke powder was placed in a graphite crucible, then the graphite crucible was placed in an Acheson graphitization furnace, where resistance materials were filled around the graphite crucible. The resistance material were heated by power on to make the current flow through to generate heat energy, in which the temperature inside the graphite crucible reached 2800° C. and was kept for 8 hours, so that the green coke powder was graphitized. The temperature was naturally cooled until the surface temperature of the graphite crucible was lower than 300° C., thereby obtaining artificial graphite.

Example 4

The preparation method of secondary battery was similar to example 1, with the exception that the preparation process of artificial graphite (step 1) was different, specifically comprising the following steps.

A petroleum-based raw material was subjected to a delayed coking process at 500° C., including a preheating prepares for 7 h, and a coke cooling process for 6 h, thereby obtaining a petroleum-based non-needle green coke having a volatile component content of 9.4%. A mechanical pulverizing equipment with an impact hammer mill was used to break the lumpy green coke into green coke powder that was controlled to have a particle size Dv10 of 3.1 µm, a particle size Dv50 of 14.3 µm, and a specific surface area of 1.97 m$^2$/g. The green coke powder was placed in a horizontal stirred tank and heated to 650° C. and kept for 1 h to deposit the volatile components contained in the green coke powder. The deposited green coke powder was placed in a graphite crucible, then the graphite crucible was placed in an Acheson graphitization furnace, where resistance materials were filled around the graphite crucible. The resistance material were heated by power on to make the current flow through to generate heat energy, in which the temperature inside the graphite crucible reached 2800° C. and was kept for 8 hours, so that the green coke powder was graphitized. The temperature was naturally cooled until the surface temperature of the graphite crucible was lower than 300° C., thereby obtaining artificial graphite.

Comparative Example 1

The preparation method of secondary battery was similar to example 1, with the exception that the preparation process of artificial graphite (step 1) was different, specifically comprising the following steps.

A petroleum-based raw material was subjected to a delayed coking process at 600° C., including a preheating prepares for 4.5 h, and a coke cooling process for 3 h, thereby obtaining a petroleum-based non-needle green coke having a volatile component content of 7.8%. A mechanical pulverizing equipment with an impact hammer mill was used to break the lumpy green coke into green coke powder that was controlled to have a particle size Dv10 of 2.6 µm, a particle size Dv50 of 14.3 µm, and a specific surface area of 1.32 m$^2$/g. The green coke powder was placed in a horizontal stirred tank and heated to 650° C. and kept for 1 h to deposit the volatile components contained in the green coke powder. The deposited green coke powder was placed in a graphite crucible, then the graphite crucible was placed in an Acheson graphitization furnace, where resistance materials were filled around the graphite crucible. The resistance material were heated by power on to make the current flow through to generate heat energy, in which the temperature inside the graphite crucible reached 2800° C. and was kept for 8 hours, so that the green coke powder was graphitized. The temperature was naturally cooled until the surface temperature of the graphite crucible was lower than 300° C., thereby obtaining artificial graphite.

Comparative Example 2

The preparation method of secondary battery was similar to example 1, with the exception that the preparation process of artificial graphite (step 1) was different, specifically comprising the following steps.

A petroleum-based raw material was subjected to a delayed coking process at 500° C., including a preheating prepares for 6 h, and a coke cooling process for 6 h, thereby obtaining a petroleum-based non-needle green coke having a volatile component content of 10.2%. A mechanical pulverizing equipment with an impact hammer mill was used to break the lumpy green coke into green coke powder that was controlled to have a particle size Dv10 of 2.4 µm, a particle size Dv50 of 9.8 µm, and a specific surface area of 2.73 m$^2$/g. The green coke powder was placed in a horizontal stirred tank and heated to 650° C. and kept for 1 h to deposit the volatile components contained in the green coke powder.

The deposited green coke powder was placed in a graphite crucible, then the graphite crucible was placed in an Acheson graphitization furnace, where resistance materials were filled around the graphite crucible. The resistance material were heated by power on to make the current flow through to generate heat energy, in which the temperature inside the graphite crucible reached 2800° C. and was kept for 8 hours, so that the green coke powder was graphitized. The temperature was naturally cooled until the surface temperature of the graphite crucible was lower than 300° C., thereby obtaining artificial graphite.

Comparative Example 3

The preparation method of secondary battery was similar to example 1, with the exception that the preparation process of artificial graphite (step 1) was different, specifically comprising the following steps.

A petroleum-based raw material was subjected to a delayed coking process at 500° C., including a preheating prepares for 6 h, and a coke cooling process for 6 h, thereby obtaining a petroleum-based non-needle green coke having a volatile component content of 10.2%. A mechanical pulverizing equipment with an impact hammer mill was used to break the lumpy green coke into green coke powder that was controlled to have a particle size Dv10 of 3.2 μm, a particle size Dv50 of 13.2 μm, and a specific surface area of 1.83 m$^2$/g. The green coke powder was placed in a horizontal stirred tank and heated to 650° C. and kept for 1 h to deposit the volatile components contained in the green coke powder. The deposited green coke powder was placed in a graphite crucible, then the graphite crucible was placed in an Acheson graphitization furnace, where resistance materials were filled around the graphite crucible. The resistance material were heated by power on to make the current flow through to generate heat energy, in which the temperature inside the graphite crucible reached 2800° C. and was kept for 8 hours, so that the green coke powder was graphitized. The temperature was naturally cooled until the surface temperature of the graphite crucible was lower than 300° C., thereby obtaining artificial graphite. The artificial graphite and asphalt were mixed at a mass ratio of 100:3, the mixed material was transferred to a carbonization furnace, and under nitrogen protection, carbonization was carried out at 1150° C. to obtain amorphous carbon-coated artificial graphite.

Comparative Example 4

The preparation method of secondary battery was similar to example 1, with the exception that the preparation process of artificial graphite (step 1) was different, specifically comprising the following steps.

A petroleum-based raw material was subjected to a delayed coking process at 500° C., including a preheating prepares for 6 h, and a coke cooling process for 6 h, thereby obtaining a petroleum-based non-needle green coke having a volatile component content of 10.2%. A mechanical pulverizing equipment with an impact hammer mill was used to break the lumpy green coke into green coke powder that was controlled to have a particle size Dv10 of 3.2 μm, a particle size Dv50 of 13.2 μm, and a specific surface area of 1.83 m$^2$/g. The green coke powder was placed in a horizontal stirred tank and heated to 650° C. and kept for 1 h to deposit the volatile components contained in the green coke powder. The deposited green coke powder was placed in a graphite crucible, then the graphite crucible was placed in an Acheson graphitization furnace, where resistance materials were filled around the graphite crucible. The resistance material were heated by power on to make the current flow through to generate heat energy, in which the temperature inside the graphite crucible reached 2800° C. and was kept for 8 hours, so that the green coke powder was graphitized. The temperature was naturally cooled until the surface temperature of the graphite crucible was lower than 400° C., thereby obtaining artificial graphite.

Comparative Example 5

The preparation method of secondary battery was similar to example 1, with the exception that the preparation process of artificial graphite (step 1) was different, specifically comprising the following steps.

A petroleum-based raw material was subjected to a delayed coking process at 600° C., including a preheating prepares for 4.5 h, and a coke cooling process for 3 h, thereby obtaining a petroleum-based non-needle green coke having a volatile component content of 7.8%. A mechanical pulverizing equipment with an impact hammer mill was used to break the lumpy green coke into green coke powder that was controlled to have a particle size Dv10 of 7.9 μm, a particle size Dv50 of 19.3 μm, and a specific surface area of 0.98 m$^2$/g. The green coke powder was placed in a graphite crucible, then the graphite crucible was placed in an Acheson graphitization furnace, where resistance materials were filled around the graphite crucible. The resistance material were heated by power on to make the current flow through to generate heat energy, in which the temperature inside the graphite crucible reached 2800° C. and was kept for 8 hours, so that the green coke powder was graphitized. The temperature was naturally cooled until the surface temperature of the graphite crucible was lower than 400° C., thereby obtaining artificial graphite.

Comparative Example 5

The preparation method of secondary battery was similar to example 2, with the exception that in the preparation of positive electrode plate, LiNi$_{0.6}$Co$_{0.2}$Mn$_{0.2}$O$_2$ was used as a positive electrode active material.

Comparative Example 6

The preparation method of secondary battery was similar to comparative example 1, with the exception that in the preparation of positive electrode plate, LiNi$_{0.6}$Co$_{0.2}$Mn$_{0.2}$O$_2$ was used as a positive electrode active material.

Example 6 and Comparative Example 7 were Prepared According to the Following Method (1) Preparation of Negative Electrode Plate The artificial graphites prepared by example 2 and comparative example 2 were respectively mixed with SiO (Dv50 of 6 μm) at a mass ratio 95:5, which mixture was used as negative active material. T negative electrode active material, with acetylene black as a conductive agent, styrene-butadiene rubber (SBR) as a binding agent, and sodium carboxymethyl cellulose (CMC-Na) as a thickener were mixed at a mass ratio of 96:1:1:1, to which deionized water as a solvent was added. Through fully stirring according to methods known in the art, a negative electrode slurry was obtained. The negative electrode slurry was evenly applied on a negative electrode current collector copper foil, and dried to obtain a negative electrode film layer. After cold pressing process, the negative electrode plate was obtained.

(2) Preparation of Positive Electrode Plate $LiNi_{0.8}Co_{0.1}Mn_{0.1}O_2$ as a positive electrode active material, polyvinylidene fluoride as a binder, acetylene black as a conductive agent were mixed at a mass ratio 97:2:1, to which N-methyl pyrrolidone (NMP) as a solvent to adjust its viscosity. Through fully stirring according to methods known in the art, a positive electrode slurry was obtained. The positive electrode slurry was evenly applied on a positive electrode current collector aluminum copper foil, and dried to obtain a positive electrode film layer. After cold pressing process, the positive electrode plate was obtained.

(3) Preparation of Electrolytic Solution

In an argon atmosphere glove box with a water content<10 ppm, ethylene carbonate (EC), dimethyl carbonate (DMC) and ethyl methyl carbonate (EMC) at a volume ratio of 30:40:30 were mixed homogeneously, to obtain organic solvent, then vinylene carbonate (VC) with a mass fraction of 1% was added and LiPF was homogeneously dissolved in the above-mentioned organic solvent of 1 mol/L, to obtain an electrolytic solution.

(4) Preparation of Separator

A polyethylene (PE) film was used as a separator.

(5) Preparation of Secondary Battery

The positive electrode plate, separator, negative electrode plate were stacked and wound in order to obtain an electrode assembly; and the electrode assembly was added to aluminum plastic film as an outer packaging, to which the electrolytic solution was injected after drying. Through encapsulation, standing, forming, aging, secondary packaging, capacity testing and other processes, the secondary battery was obtained.

Test

Dv10, Dv50, specific surface area, tap density, and powder compaction density of artificial graphite were tested according to the method described above in the specification.

(1) Air Oxidation Peak Temperature $T_{peak}$ Test of Artificial Graphite

The artificial graphite having a weighing mass of 10±0.05 mg was subjected to a thermo-gravimetric test, with a purging gas of air, an airflow rate of 60 mL/min, and a heating rate of 5° C./min in a test temperature range of 40° C. to 950° C. to obtain the highest peak of a differential thermo-gravimetric analysis curve, i.e. air oxidation peak of artificial graphite. The temperature of the highest peak was $T_{peak}$.

Specifically, NETZSCH STA 449 F3 synchronous thermal analyzer, Germany was used for testing. First, 10±0.05 mg of artificial graphite sample was weighted, which was placed into a flat-bottomed $Al_2O_3$ crucible without covering the lid. The instrument parameters were set in which air was used as a purge gas and its airflow rate was set to 60 mL/min, nitrogen was used as protective gas and its airflow rate was set to 20 mL/min; the heating rate was 5° C./min and the test was carried out in a temperature range of 40° C. to 950° C. When the temperature was lower than 500° C., since there were no characteristic peaks at this stage, rapid temperature increase can be performed, for example, the heating rate was set to 10° C./min.

(2) Fast Charging Performance Test

At 25° C., the secondary battery was charged and discharged for the first time with a current of 0.33C (wherein 1C represents a current value at which the theoretical capacity of the secondary battery is discharged completely within 1 h). The specific steps included: charging the secondary battery with a constant current of 0.33C to a upper cut-off voltage, and then charging the secondary battery with a constant voltage until the current was less than or equal to 0.05C; allowing the secondary battery to stand for 5 minutes, discharging it to a lower cut-off voltage with a constant current of 0.33C, and recording the actual discharge capacity C0 of the secondary battery.

The secondary battery was successively charged with a constant current of different charging rates, 0.5C0, 0.8C0, 1.2C0, 1.5C0, 2.0C0, 2.5C0, 3.0C0, 4.0C0, 5.0C0 to a upper cut-off voltage or to reach a negative electrode potential of 0V (whichever comes first). After each charge was completed, the secondary battery was required to be discharged to a lower cut-off voltage at 0.33C0. The negative electrode potentials corresponding to charging the secondary battery to 10% SOC 20% SOC, 30% SOC, 40% SOC, 50% SOC, 60% SOC, 70% SOC, and 80% SOC (SOC represents state of charge of the secondary battery) at different charging rates were recorded.

A charging rate-negative electrode potential curve at different states of charge was plotted, which curve was linearly fitted to draw the corresponding charging rate when negative electrode potential was 0V at different states of charge. The charging rate was the charging window at the state of charge. The charging windows at different states of charge were recorded as C10% SOC, C20% SOC, C30% SOC, C40% SOC, C50% SOC, C60% SOC, C70% SOC, and C80% SOC.

According to the formula (60/C20% SOC+60/C30% SOC+60/C40% SOC+60/C50% SOC+60/C60% SOC+60/C70% SOC+60/C80% SOC)×10%, the charging time T for charging the secondary battery from 10% SOC to 80% SOC was calculated. The shorter the charging time, the better the fast charging performance of the secondary battery was.

(3) Cycle Performance Test

At 25° C., the secondary battery was charged to a upper cut-off voltage with a constant current of 1C rate, and then was charged with a constant voltage to a current of ≤0.05C. The charging capacity at this time was recorded, which was a first-cycle charging capacity. The secondary battery was discharged with 1C constant current to a lower cut-off voltage, and then was allowed to stand for 5 min. This was a charge-discharge cycle process. The discharge capacity at this time was recorded, which was the first-cycle discharge capacity.

The secondary battery was subjected to the above-mentioned charge-discharge cycle process and the discharge capacity after each cycle was recorded until the discharge capacity of secondary battery decayed to be 80% of the first-cycle discharge capacity. The cycle number at the moment was used to characterize the cycle performance of the secondary battery.

The first-cycle Coulomb efficiency of secondary battery=first-cycle discharge capacity/first-cycle charge capacity×100%.

The charge-discharge voltage range of the secondary battery of examples 1-4 and comparative examples 1-5 was from 2.5V to 3.65V. The charge-discharge voltage range of the secondary battery of example 5 and comparative example 6 was from 2.8V to 4.35V. The charge-discharge voltage range of the secondary battery of example 6 and comparative example 7 was from 2.5V to 4.25V.

The test results of the artificial graphite of examples 1-4 and comparative example 1-5 were shown in Table 1. Table 2 presents the performance test results of the secondary batteries of Examples 1 to 4 and Comparative Examples 1 to 5. Table 3 presents the performance test results of the secondary batteries of Example 5 and Comparative Example 6. Table 4 presents the secondary battery performance test results of Example 6 and Comparative Example 7.

TABLE 1

| No. | $T_{peak}$ (° C.) | Dv10 (μm) | Dv50 (μm) | Specific surface area (m²/g) | Tap density (g/cm³) | Powder compaction density (g/cm³) 20000N | Powder compaction density (g/cm³) 50000N |
|---|---|---|---|---|---|---|---|
| Example1 | 830 | 6.9 | 14.6 | 1.05 | 1.21 | 1.78 | 1.94 |
| Example2 | 838 | 7.1 | 14.5 | 1.02 | 1.23 | 1.80 | 1.96 |
| Example3 | 835 | 7.3 | 15.2 | 0.97 | 1.20 | 1.79 | 1.95 |
| Example4 | 839 | 7.4 | 15.6 | 0.99 | 1.25 | 1.81 | 1.97 |
| Comparative Example1 | 828 | 4.7 | 15.7 | 1.20 | 1.21 | 1.78 | 1.93 |
| Comparative Example2 | 826 | 6.2 | 12.3 | 1.40 | 1.19 | 1.75 | 1.91 |
| Comparative Example3 | 799 | 4.8 | 14.9 | 1.02 | 1.18 | 1.73 | 1.89 |
| Comparative Example4 | 824 | 6.9 | 13.4 | 1.36 | 1.21 | 1.79 | 1.96 |
| Comparative Example5 | 832 | 7.9 | 19.3 | 0.98 | 1.27 | 1.83 | 1.98 |

TABLE 2

| No. | Charging Period T(min) | first-cycle coulomb efficiency | Cycle number |
|---|---|---|---|
| Example1 | 9.1 | 93.5% | 7480 |
| Example2 | 9.2 | 93.6% | 7600 |
| Example3 | 9.6 | 93.5% | 7500 |
| Example4 | 9.8 | 93.8% | 7800 |
| Comparative Example1 | 11.8 | 92.2% | 6000 |
| Comparative Example2 | 9.5 | 92.4% | 5900 |
| Comparative Example3 | 9.3 | 91.7% | 5500 |
| Comparative Example4 | 9.7 | 91.8% | 5600 |
| Comparative Example5 | 14.7 | 93.4% | 5950 |

TABLE 3

| No. | Charging Period T(min) | first-cycle coulomb efficiency | Cycle number |
|---|---|---|---|
| Example5 | 9.3 | 87.7% | 2200 |
| Comparative Example6 | 11.4 | 87.1% | 2000 |

TABLE 4

| No. | Charging Period T(min) | first-cycle coulomb efficiency | Cycle number |
|---|---|---|---|
| Example6 | 9.3 | 89.2% | 1800 |
| Comparative Example7 | 9.5 | 88.2% | 1500 |

It can be seen from the data in Table 2 that, compared with Comparative Examples 1-5, the secondary batteries of Examples 1-4 has a higher first-cycle Coulomb efficiency and a longer cycle life. This is mainly due to the fact that the air oxidation peak temperature $T_{peak}$ of the artificial graphite of Examples 1 to 4 is greater than or equal to 830° C., which means that the number of electrochemically active sites and active groups on the surface of the artificial graphite is lower, and irreversible consumption of active ions with the artificial graphite is reduced. Thus, the secondary battery can have a higher first-cycle Coulomb efficiency and a longer cycle life on the premise of good fast charging performance.

In comparative examples 1-4, the air oxidation peak temperature $T_{peak}$ of the artificial graphite is less than 830° C., which represents that the number of electrochemically active sites and active groups on the surface of the artificial graphite is higher, and thus irreversible consumption of active ions with the artificial graphite is increased so that the secondary battery cannot have a higher first-cycle Coulomb efficiency and a longer cycle life on the premise of good fast charging performance. In Comparative Example 1, the green coke raw material is treated at a higher coking temperature, resulting in that the green coke powder has a too low content of volatile components. The volatile components is not likely to be deposited sufficiently, it is impossible to form an integral protective layer on the surface of the artificial graphite, and the defect sites of artificial graphite cannot be fully modified on its surface. Thus, irreversible consumption of active ions with artificial graphite is higher. In Comparative Example 2, the content of fine powder in the green coke powder is high, and there are a large number of defect sites on the surface of the fine powder, so irreversible consumption of active ions with artificial graphite is also high. In Comparative Example 3, artificial graphite coated with amorphous carbon is used, and the air oxidation peak temperature $T_{peak}$ of artificial graphite is only 799° C. This is mainly due to the fact that the carbon coated on the surface of artificial graphite is soft carbon, and the soft carbon has a low thermal stability, is easy to oxidative decomposition, and has a large number of active groups on its surface, resulting in high irreversible consumption of active ions. In Comparative Example 4, when preparing artificial graphite, a higher discharging temperature was selected, resulting in the generation of a large number of active groups on the surface of artificial graphite under the action of air oxidation, and increasing irreversible consumption of active ions.

In comparative example 5, the artificial graphite has an air oxidation peak temperature $T_{peak}$ of greater than or equal to 830° C., but has a Dv50 of greater than 16 μm. The secondary battery adopting it cannot have a good fast charging performance, a higher first circle Coulomb efficiency and a longer cycle life.

It can be seen from the data in Table 3 that, compared with Comparative Example 6, the secondary battery of Example 5 has an improved first-cycle Coulomb efficiency by about 0.6%, and an improved cycle life by about 10%. It can be seen from the data in Table 4 that, compared with Comparative Example 7, the secondary battery of Example 6 has an improved first-cycle Coulomb efficiency by about 1.1%, and an improved cycle life by about 20%

From the data of table 2 to table 4, it can be recognized that the advantage of the artificial graphite of the present application can be better embodied in the battery system whose negative electrode active material has a first-cycle Coulomb efficiency less than its positive electrode active material, and in the battery system where the irreversible consumption of active ions with negative electrode active materials dominates its cycle life.

It should be noted that the application is not limited to the above-mentioned embodiments. The above-described embodiments are merely examples, and embodiments having substantially the same configuration as the technical idea and exerting the same effects within the scope of the technical solution of the present application are all included in the technical scope of the present application. In addition, in the scope which does not deviate from the gist of the present application, various modifications that can be conceived by those skilled in the art are applied to the embodiment, and other modes constructed by combining some of the constituent elements of the embodiment are also included in the scope of the present application.

The invention claimed is:

1. An artificial graphite having a particle size Dv50 from 13 μm to 15.6 μm, a particle size Dv10 from 5 μm to 9 μm, a specific surface area from 0.8 m$^2$/g to 1.1 m$^2$/g, a powder compaction density of 1.6 g/cm$^3$ to 1.85 g/cm$^3$ under a force of 20,000 N, a powder compaction density of 1.7 g/cm$^3$ to 2.0 g/cm$^3$ under a force of 50,000 N, a tap density of 1.10 g/cm$^3$ to 1.30 g/cm$^3$, and an air oxidation peak temperature $T_{peak}$ of 830° C. to 839° C., wherein the air oxidation peak temperature $T_{peak}$ of artificial graphite refers to a highest peak temperature of a differential thermo-gravimetric analysis curve obtained when the artificial graphite is subjected to a thermo-gravimetric test having a weighing mass of 10±0.05 mg, with a purging gas of air, an airflow rate of 60 mL/min, and a heating rate of 5° C./min, in a test temperature range of 40° C. to 950° C.

2. The artificial graphite according to claim 1, wherein the air oxidation peak temperature $T_{peak}$ of the artificial graphite is from 831° C. to 838° C.

3. The artificial graphite according to claim 1, wherein the artificial graphite has no amorphous carbon coating layer on its surface.

4. The artificial graphite according to claim 1, wherein the artificial graphite further satisfies one or more of the following:
the artificial graphite has a gram capacity of ≥353 mAh/g; and
the artificial graphite has a first-cycle Coulomb efficiency of ≥95%.

5. The artificial graphite according to claim 1, wherein the particle size Dv10 is from 6.9 μm to 7.4 μm.

6. A secondary battery comprising a positive electrode plate, a negative electrode plate, a separator, and an electrolyte, the negative electrode plate comprises a negative electrode current collector and a negative electrode film layer disposed on at least one surface of the negative electrode current collector, the negative electrode film layer comprises a negative electrode active material, the negative electrode active material comprises artificial graphite, the artificial graphite has a particle size Dv50 from 13 μm to 15.6 μm, a particle size Dv10 from 5 μm to 9 μm, a specific surface area from 0.8 m$^2$/g to 1.1 m$^2$/g, a powder compaction density of 1.6 g/cm$^3$ to 1.85 g/cm$^3$ under a force of 20,000 N, a powder compaction density of 1.7 g/cm$^3$ to 2.0 g/cm$^3$ under a force of 50,000 N, a tap density of 1.10 g/cm$^3$ to 1.30 g/cm$^3$, and an air oxidation peak temperature $T_{peak}$ of 830° C. to 839° C., wherein the air oxidation peak temperature $T_{peak}$ of artificial graphite refers to a highest peak temperature of a differential thermo-gravimetric analysis curve obtained when the artificial graphite is subjected to a thermo-gravimetric test having a weighing mass of 10±0.05 mg, with a purging gas of air, an airflow rate of 60 mL/min, and a heating rate of 5° C./min, in a test temperature range of 40° C. to 950° C.

7. The secondary battery according to claim 6, wherein the air oxidation peak temperature $T_{peak}$ of the artificial graphite is from 831° C. to 838° C.

8. The secondary battery according to claim 6, wherein the particle size Dv10 is from 6.9 μm to 7.4 μm.

9. The secondary battery according to claim 6, wherein the particle size Dv50 is from 14.5 μm to 15.6 μm.

10. The secondary battery according to claim 6, wherein the specific surface area is from 0.97 m$^2$/g to 1.05 m$^2$/g.

11. The secondary battery according to claim 6, wherein the powder compaction density is 1.78 g/cm$^3$ to 1.81 g/cm$^3$ under a force of 20,000 N.

12. The secondary battery according to claim 6, wherein the powder compaction density is 1.94 g/cm$^3$ to 1.97 g/cm$^3$ under a force of 50,000 N.

13. The secondary battery according to claim 6, wherein the tap density of 1.20 g/cm$^3$ to 1.25 g/cm$^3$.

14. The secondary battery according to claim 6, wherein the artificial graphite has no amorphous carbon coating layer on its surface.

15. The secondary battery according to claim 6, according to claim 1, wherein
the artificial graphite has a gram capacity of ≥353 mAh/g; and
the artificial graphite has a first-cycle Coulomb efficiency of ≥95%.

* * * * *